US010180979B2

(12) United States Patent
Perlegos

(10) Patent No.: US 10,180,979 B2
(45) Date of Patent: Jan. 15, 2019

(54) SYSTEM AND METHOD FOR GENERATING SUGGESTIONS BY A SEARCH ENGINE IN RESPONSE TO SEARCH QUERIES

(71) Applicant: Fotofad, Inc., Zephyr Cove, NV (US)

(72) Inventor: Nick John Perlegos, Zephyr Cove, NV (US)

(73) Assignee: Pixured, Inc., Zephy Cove, NV (US)

( * ) Notice: Subject to any disclaimer, the term of this patent is extended or adjusted under 35 U.S.C. 154(b) by 1031 days.

(21) Appl. No.: 13/793,136

(22) Filed: Mar. 11, 2013

(65) Prior Publication Data

US 2014/0195506 A1 Jul. 10, 2014

Related U.S. Application Data

(60) Provisional application No. 61/848,589, filed on Jan. 7, 2013.

(51) Int. Cl.
*G06F 17/30* (2006.01)

(52) U.S. Cl.
CPC .... *G06F 17/3064* (2013.01); *G06F 17/30864* (2013.01)

(58) Field of Classification Search
None
See application file for complete search history.

(56) References Cited

U.S. PATENT DOCUMENTS

| 7,428,321 | B1 | 9/2008 | Shah et al. |
| 7,479,949 | B2 | 1/2009 | Jobs et al. |
| 7,840,547 | B1* | 11/2010 | Tucker et al. ............... 707/706 |
| 2010/0172579 | A1 | 7/2010 | Reid et al. |
| 2011/0249144 | A1 | 10/2011 | Chang |
| 2013/0117258 | A1* | 5/2013 | Linsley ............ G06F 17/30864 707/722 |
| 2013/0282682 | A1* | 10/2013 | Batraski et al. ............. 707/706 |
| 2014/0075393 | A1* | 3/2014 | Mei ................... G06F 17/30967 715/863 |
| 2015/0370833 | A1* | 12/2015 | Fey ................... G06F 17/30277 707/767 |

* cited by examiner

*Primary Examiner* — Anhtai V Tran
(74) *Attorney, Agent, or Firm* — Wood, Phillips, Katz, Clark & Mortimer

(57) ABSTRACT

As disclosed herein, a computer-implemented method within a server system generates suggestions by a search engine in response to search queries. The method uses a database associated with the search engine, the database storing digital media items each selectively associated with queries, terms and/or objects. The search engine receives a search query from a user device. The method compares one or more parts of the search query with stored queries, terms and/or objects within the database to find matching digital media items and generates at least one suggestion based on search query, the suggestion comprising one of the matching digital media items and at least one search result based on search query. The search engine transmits an output to the user device comprising the at least one suggestion and/or the at least one search result.

24 Claims, 22 Drawing Sheets

SYSTEM AND METHOD FOR GENERATING SUGGESTIONS BY A SEARCH ENGINE IN RESPONSE TO SEARCH QUERIES

CROSS-REFERENCE TO RELATED APPLICATIONS

This application claims priority of provisional application No. 61/848,589 filed Jan. 7, 2013.

FEDERALLY SPONSORED RESEARCH OR DEVELOPMENT

Not Applicable.

MICROFICHE/COPYRIGHT REFERENCE

Not Applicable.

FIELD OF THE INVENTION

This application relates to computer implemented searching methods, and more particularly, to generating suggestions in response to search queries.

BACKGROUND

Today massive amounts of information and data can be found on or provided by users on the World Wide Web. Search engines, indexing, and ranking of various information and data are required to be continually improved with the changes and advancements in technology. In some cases users searching a search engine do not reach desired and/or relevant results, from just keywords and/or terms, making it difficult to obtain the information they are seeking. Even more difficult is when the user from another locality is seeking information they are not accustomed to or in some cases completely different. Usually from user requests search engines return results from catalogues, web pages, information, and data.

Search engines are used to generate results typically from a users query and in most cases the search engines produces the most relevant and in context search results. Known search engines provide the ability to pinpoint links, digital media, images, web pages, documents and/or information the user is looking for. Users from different cultures, traits, characteristic, subscriptions and/or relationships can reach the same results and/or types of results from a search query. Additionally one or more third party applications may incorporate suggestions in a number of applications from storefronts to departments store to travel agencies, to food and restaurants.

This application is directed to improvements in obtaining search results.

SUMMARY

As described herein, a system and method generates suggestions by a search engine in response to search queries.

In accordance with one aspect of the invention, a computer-implemented method within a server system generates suggestions by a search engine in response to search queries. The method uses a database associated with the search engine, the database storing digital media items each selectively associated with queries, terms and/or objects. The search engine receives a search query from a user device. The method compares one or more parts of the search query with stored queries, terms and/or objects within the database to find matching digital media items and generates at least one suggestion based on search query, the suggestion comprising one of the matching digital media items and at least one search result based on search query. The search engine transmits an output to the user device comprising the at least one suggestion and/or the at least one search result.

Other features and advantages will be apparent from a review of the entire specification, including the appended claims and drawings.

DETAILED DESCRIPTION

Figure 1:
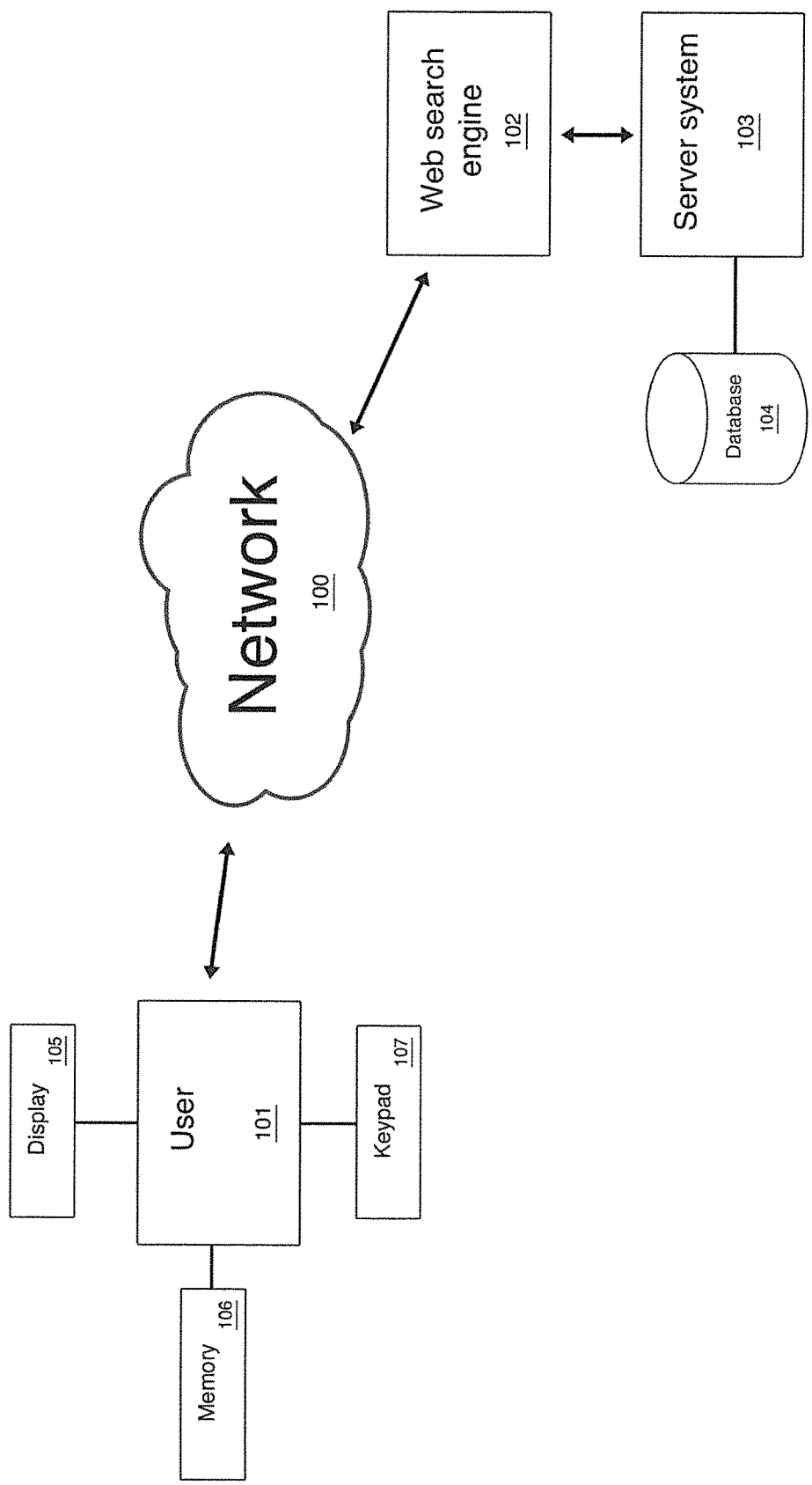
FIG. 1 is a block diagram illustrating a user device interacting with a web search engine through a network.

The present invention is related to and in the direction of a combination of keywords and a digital media query system whereby methods of computer programs would enrich, simplify, accelerate, and optimize search queries, index, suggestions, historical logs and results. By maximizing the use of digital media, parts of digital media, and/or association large amounts of data can be searched, stored and identified. Users of different cultures may find similarities with users of other cultures whereby advertiser may target a more broad diverse audience and business may interact with one or more user with a much farther reach. In some cases suggestions may increase the ability for users to reach better links to external sites based on queries, real time information, shopping, whereby also getting to answers directly or even discovering results that could never have been reach. Suggestions may be presented to user in different orientations, sizes, aspect ratios, while also being interactive whereby while holding a mouse clicker over could present additional information and/or information.

The suggestions and/or results include methods based on search queries from users of information, data, digital media and documents indexed from the World Wide Web and custom/inputted information, data, digital media and documents. A user could use a plurality of search queries that use digital media (digital images, documents, digital video and digital sound) keywords, symbols and/or combination of where suggestions and results from a search engine of index from the World Wide Web and custom/inputted information, data, digital media and documents. The web search may comprise various algorithms that rank/score on various parameters, while further including various second algorithms and combination of algorithms of ranking/score.

The said method may also includes calculating a rating, price, relationship and/or answer to a request with or without data and/or information from a social entity and/or objects. Product, service, application, solution, digital media, digital data, and/or data may in some embodiments relate to traits/categories, proximity, habits, insight, ideal prospects, attributes, behaviours, topic, interest, keywords, remarketing, education, work place, origin, location targeting, demographics, adaptive profiling, participation, feeds, trends, postings, photos, blogs, topics, stories, advertisements, comments, current ratings, ownership, values are determined from the identified and/or selected associations of one more users, groups, digital data and/or digital media. Some embodiments may include timing components. The system and said method may implement distribution (Gaussian, logistic, lognormal, Weibull), likelihood functions, Bayesian inference and/or timing (decay function) to calculate and/or determine a rating, price and/or answer based on multiple variables aided by social ranking. Some embodiments may include the combinations of and multi-deviations of implemented distribution (Gaussian, logistic, lognormal, Weibull), likelihood functions, Bayesian inference and/or timing. Additionally the value and/or generated distributions or values (including) variations and width including providing simplified objects or values. Some embodiments may use calculated and/or mathematical techniques to analyze and/or display variables, digital media, data and information. Social networks provide a number of ways to analyze social ranking whereby the method enlists code to perform operations and analysis while also data relating to values, ranking and scores (may user F# or C# and/or combination of), including embodiments that calculate the probability that a user or where the user would like and/or relate to and may be within one or more standard deviation and/or deviations (may comprise to include a mean) which may include products, services, applications, solutions, digital medias, digital data, and/or data.

The embodiments disclosed below are not intended to be exhaustive or limit the invention to the precise form disclosed in the following detailed description. Rather, the embodiments are chosen and described so that others skilled in the art may utilize its teachings. Additionally referencing numbers in various figures may classify similar and/or identical elements.

Any references to data, information, and digital media broadly may include any machine, server, storable machine, and artificial intelligent machine. Data, information, and digital media may include one or more of digital images, digital video, digital documents, advertisements, publications, and digital sound. Furthermore, digital media may also comprise of identified parts and/or associations that may be indexed and/or ranked. Additional inputted data, information, and digital media indexed from the World Wide Web and users may be re-crawled and/or re-ranked/scored one or more times. When ranked and/or scored may include a one or more initial ranking for one or more descriptors and may additionally have one or more combination of rankings for every index and/or user search query. Returned results for search queries may include text and/or textual information, metadata, hyperlinks, tags, images, content, summarizations of and/or links to data, information, web pages and digital media. In some embodiments indexed data that has low or very little worth may limit the amount of information that is indexed.

Other embodiments may also be used in a social environment containing relationships with a plethora of people, groups, businesses, object, products, etc. Additionally metadata could be associated with digital media, parts of digital media and/or associations from a user and/or automatically tagged to describe the said digital media, parts of digital media and/or associations. Furthermore data, time, date, and/or timestamps, GPS, GSM stamps may be included in digital media, parts of digital media, and/or association.

In some embodiments parts may be combined and/or separated into other components. One example would include a server system whereby the said server system could be parted into a plurality of server systems with identical and/or various components. In some embodiments user devices could be represented by while not limiting the scope of user device by a touch-less phone with buttons, a touch-less phone (with scrolling and buttons), touch screen (with buttons), touch screen (with buttons and scrolling), headwear accessories (with multifunction capabilities), satellite phone, wireless phone, multifunctional touch device (without buttons), multifunctional touch device (with buttons), simple device, GPS device, desktop computer, server, laptop, machine, artificial intelligent machine, or smartphone, etc. Devices connected through the communication network using the Internet, cellular connection, satellite connection, intranet, local area networks, wide area networks, wireless networks, and or related. While also when applicable NFC (near field communication). The user devices may operate using any operating system and software components and/or drivers that control and manage general system responsibilities (i.e., memory, memory management, storage device control, power management, etc.) and while also enabling interactions among various hardware and software components. The user device and/or server system could be equipped with a camera or scanner that would have abilities to capture images (or digital media). Memory would include one or more DRAM, SRAM, DDR RAM while also including solid state drives, non-volatile memory, magnetic disk drive, optical disk storage, flash memory. The communications network and/or networks include Internet, cellular connection, satellite connection, intranet, local area networks, wide area networks, wireless networks, and or related. The user device includes computer terminals, wireless telephone, wired telephone, personal digital assistant, digital capturing device, Internet enabled tablets, or the like.

Digital media and parts and/or associations of digital media may be found from Personal Computers, PDA, tablets, smartphones, portable computers, computing devices, cell phones, servers, cluster, server farms, and other computing devices that can process data and/or capability of processing data, that may store and/or manage a plurality of data, information, and/or digital media. In some embodiments data, information, digital media including parts of and/or associations, a user may identify, activate and implement using their finger, button, scrolling wheeling, mouse, track pad, pen etc. Also third party application providers may use the said interface, for example an application programming interface, that would allow third parties to display in various formats for search queries. Additionally content providers (including advertisers and an advertising platform) can specify a plurality of specifications where content provided by content providers could be presented to one or more users and/or in response to one or more search queries. Third party and content providers are intended to enhance the users experience and/or search queries. In some embodiments, data, information, digital media, and/or relating could be formatted and or stored as XML whereby containing data used for web services. Additionally documents object models, pull parsing and/or as a type.

Outputted and/or generated results may include least one suggestion and/or corrections, search result to the user from any received search query. A user may or may not input a specific search query whereby search result may include information and data relating to geocode, geolocal, time, real-time and/or relationship from one or more users and or subscriptions. In some embodiments the inventive method would exclude one or more of the same results presented to user that perform search queries.

Using suggestions may also include eliminating colors, terms, keywords, object, shape, background, foreground, indicating proportions, activity, ownership, leisure, participation, advertisements, deal, coupon, mood, song, meaning and/or representation. From the presented search, other examples may include using an image and describing the said image with a color and/or removing the same color or another color. In some embodiments suggestions and/or results may include generic search results and/or generic suggestions whereby based on metrics and/or models may or may not have been impacted by search queries. Generic search results and/or generic suggestions may also be impacted by proximity, location, identified location, and/or advertisements.

In some embodiments a trust server may be used whereby a user logs in and may maintain a profile. Additionally a user may have subscribed to one or more content providers that share and/or contain one or more relationships in a social web. Servers could provide content to one or more users whereby one or more servers could be variously shared.

The server system may utilize one or more parts of the search query and include correlating data of previously occurring search queries and base matching frequency of search queries and previously selected queries while also creating historical logs of imputed queries, generated suggestions, generated corrections, selected suggestions and/or corrections, and results. In some embodiments traits, customs, identity profiles could provide enhanced results for users across various cultures and languages. Characteristics, traits, cultures relating to the users country of origin, profile, native language, and/or searched language may be used.

Referring to FIG. 1, a block diagram illustrates an exemplary system for implementing the method for generating suggestions by a search engine in response to search queries. A cloud 100 represents a communication network for providing electronic communications. A web search engine 102 can communicate over the network 100 with one or more users represented by an exemplary user device 101. The user device 101 comprises a programmed processing device operating in accordance with programs stored in a memory and or communicated over the network 100, as is known. The user device 101 is operatively associated with a display 105 and an input device such as a keypad 107. The display 105 and the keypad 107 could be included as parts of a conventional touch screen display, or the like. The user device 101 is not intended to be limited to any particular device, as noted above.

As is apparent, FIG. 1 is illustrative of an environment in which the methodology described herein can be implemented. However, the invention is not intended to be limited to any particular hardware implementation. Each block may represent a computer processing system or systems or a network of computer processing systems, servers, or the like, as necessary to implement the invention. The blocks are intended to represent functionality implemented using one or more conventional processing systems, as will be apparent to those skilled in the art.

One or more users may input search queries into the web search engine 102 that are processed through a server system 103 associated with a database 104. In some embodiments the web search engine 102 may be part of the server system 103 whereby the server system 103 may comprise of one or more bus, processors, memory, ROM, I/O devices, storage, processing logic, RAM, microprocessors, and an interface for communication making up and not limited by one or more servers and databases. The web search engine 102 may be used to search for digital media, parts of digital media, and/or association to those that match a search query whereby generating suggestions, corrections, and/or search results. Generated results may comprise of keywords, terms, links, webpages, descriptions, summarization, digital media, digital data, images, video, sound, documents, tags, hits, descriptors, and/or news.

The database 104 may store data and information used to generate suggestions to a user in response to search queries. The database may be built from content provided by users and crawled from the web and other various networks. It may also utilize public data sets.

Suggestions are determined a number of ways and may use relevance scores, predictive scores, comparative scores, and the like. Suggestions are given a predictive score based on the likelihood that a user is searching for something close to what is represented in the digital media. This could include photos (or visuals) or digital content crawled from the web. Digital media includes assigned descriptors (for example an id, keywords, hashtags, tags, etc.

The suggestions may also be defined as to a users location, or relates or based on traits/categories, proximity, habits, insight, ideal prospects, attributes, behaviors, topic, interest, keywords, remarketing, education, work place, location targeting, demographics, adaptive profiling, participation, ownership, values that are determined from the identified and/or selected associations. Search results may be based on any of these as well but the method is adapted to provide the best results for a user to find what they are looking for.

For example, assume that a user searches with a photo or a keyword. The methodology will give a relevance score to any part of the search query. This includes any keyword, whole photo, any part of the photo and/or association (associations would be items such as a toy or a logo or brand) found within the photo. When dealing with photos the web search engine 102 will match similar photos within the database 104 and automatically recognize any search query where everything is given a score matched and ranked. Thus the suggestions will provide identified associations that are mainly used to further aid the search results by redefining and/or adding value to the search query.

Figure 2A:
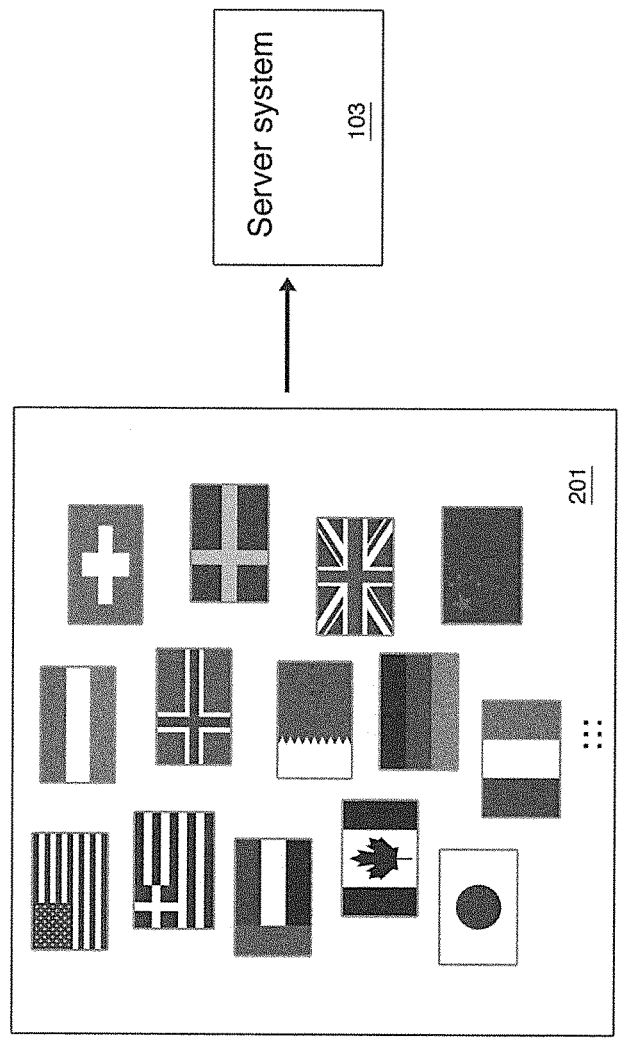
FIG. 2A illustrates a plurality of customs, demographic, locations, and languages interacting with a server system.

FIG. 2A illustrates that the server system 103 offers and can process multiple languages represented by flags in a block 201 while generating search results that in some embodiment may or may not impact suggestions, corrections, and/or search results. Traits, customs, identifies profiles could provide enhanced results for user across various cultures and languages.

Figure 2B:
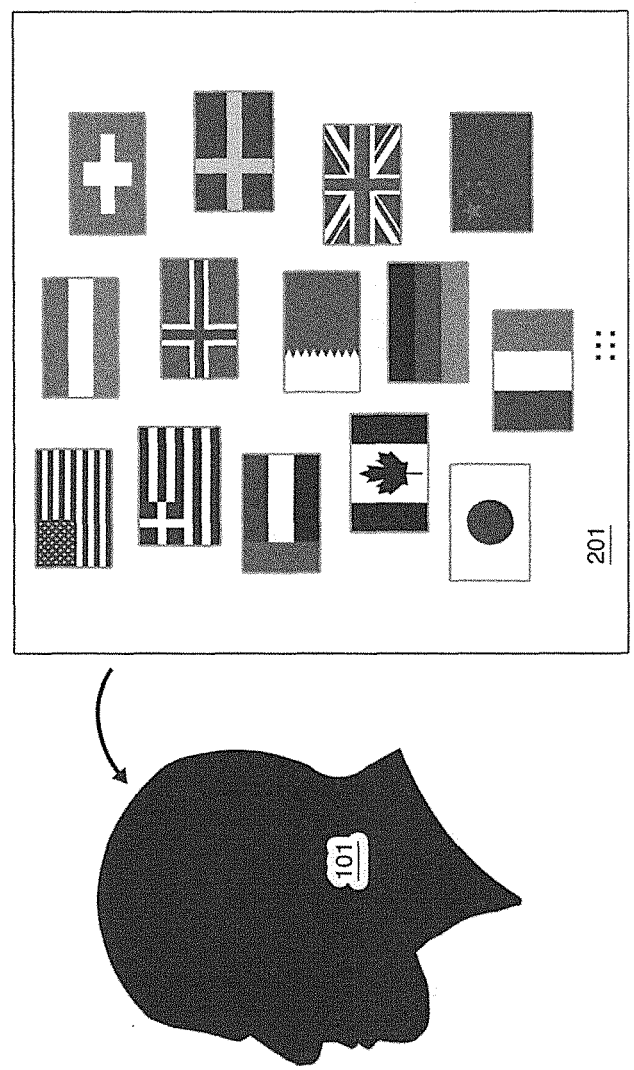
FIG. 2B illustrates users with a plurality customs, demographic, locations, origins and languages.

FIG. 2B illustrates how a user, who is using the user device 101 comprises a number of characteristics, traits, cultures relating to the users country of origin, profile, native language, and/or searched language 201.

Figure 3A:
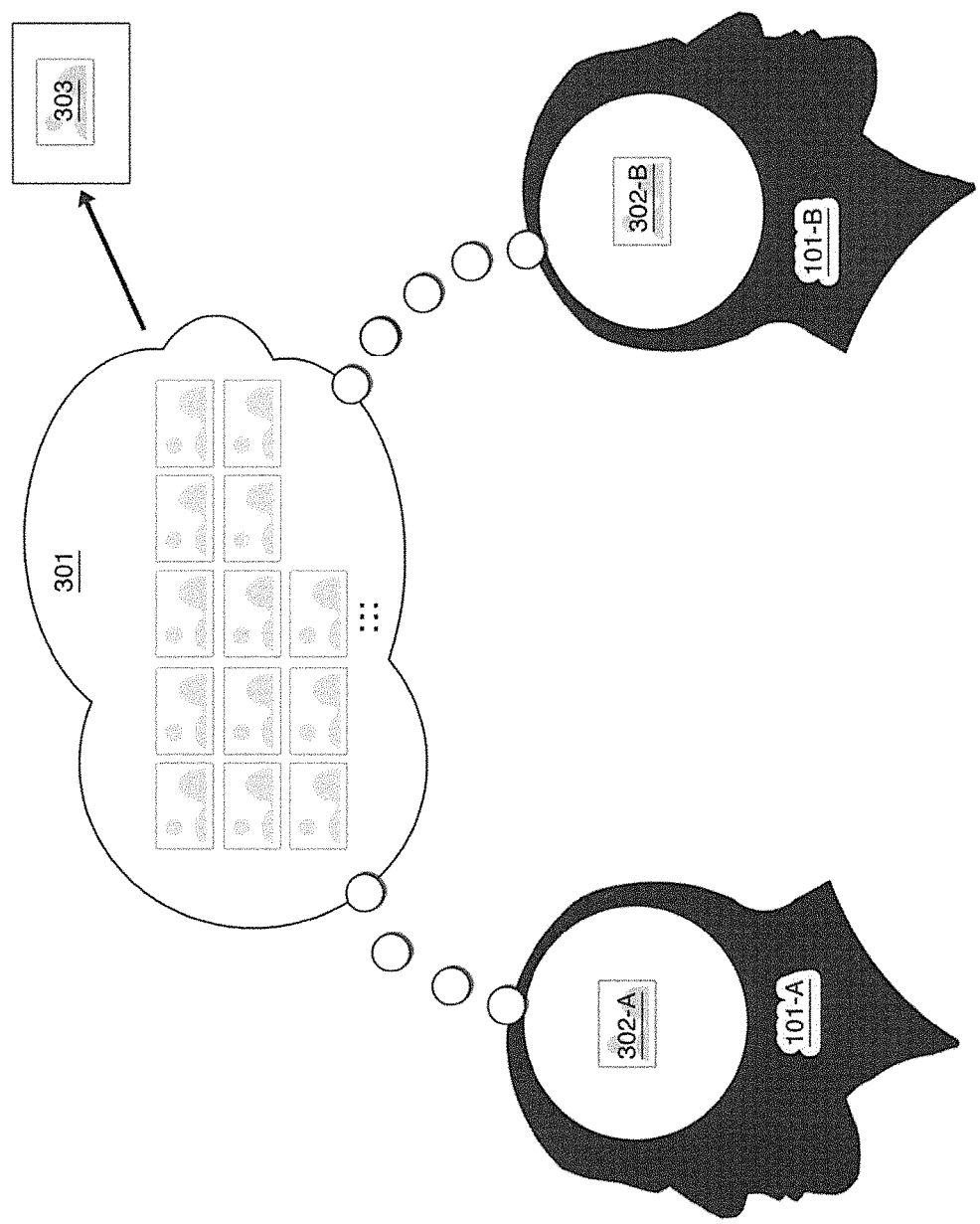
FIG. 3A illustrates one or more users reaching the identical and/or similar results from search queries of digital media.

FIG. 3A illustrates how users of user devices 101-A, 101-B have in mind one or more thoughts 302-A, 302-B of similar and/or identical images 302-A, 302-B that the said users are looking for while searching for an image 301 through a web search engine both users could select and/or be presented with the same results 303.

Figure 3B:
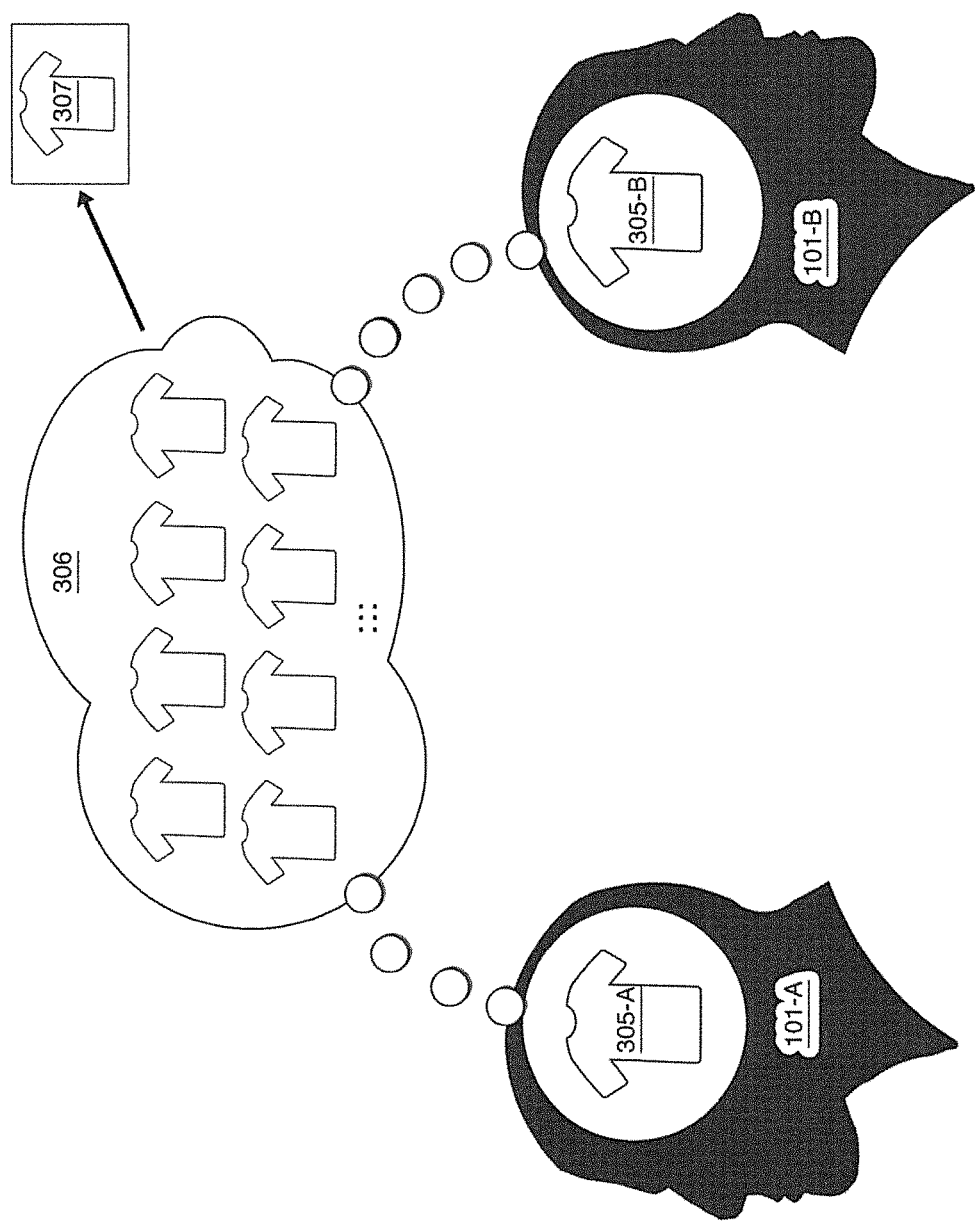
FIG. 3B illustrates one or more users reaching the identical and/or similar results from search queries of a product.

FIG. 3B illustrates how users of user devices 101-A, 101-B have in mind one or more thoughts 305-A, 305-B of similar and/or identical product 305-A, 305-B the said users are looking for, whereby searching for the product 306 through a web search engine both users could select the same results 307. In some embodiments the product that one or more users are looking for is apparel, more specifically a shirt whereby through a web search engine, said users may be presented with one or more results where the said user continues to define the search query or selects one or more generated results 307.

Figure 3C:
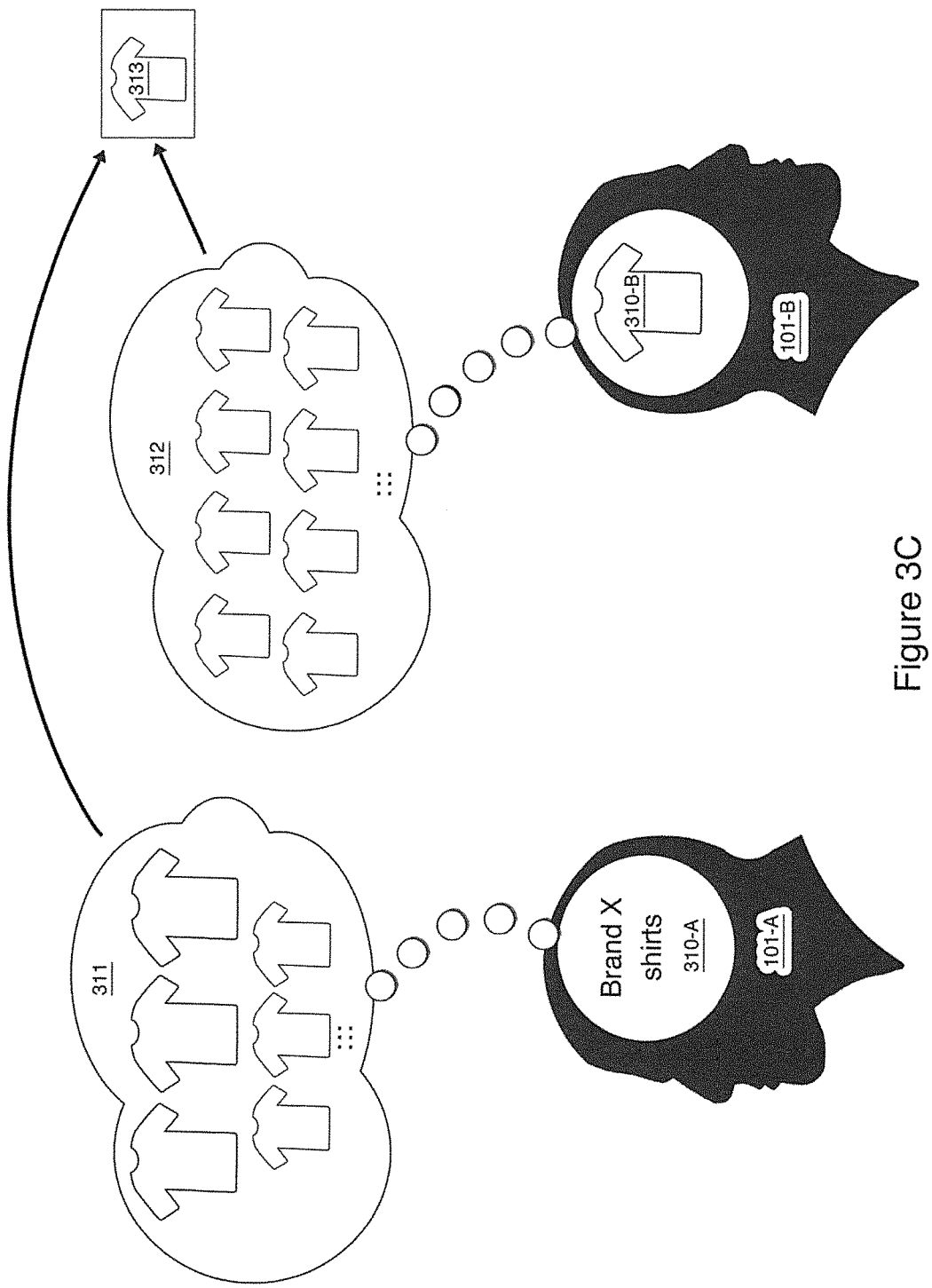
FIG. 3C illustrates one or more users reaching the identical and/or similar results from similar search queries that produced similar results of a product.

FIG. 3C illustrates how users of user devices 101-A, 101-B have in mind one or more thoughts of similar and/or identical product 311, 312 the users are looking for. User device 101-A is used to enter keywords 310-A, or terms, or numbers, or the like, and the other user uses user device 101-B to enter a picture 310-B representing the desired search query. Both users could select the same search results 313 that are generated in response to the specific users search query. In some embodiment the product that one or more users are looking for is apparel, more specifically a shirt whereby through a web search engine, one user may search for a particular Brand X shirt and may be presented with one or more results where the said user continues to define the search query or selects one or more generated results. Another user may be searching for a similar and/or identical shirt where the said user may use a photo and/or barcode for the search query whereby the web search engine generates one or more results where the said user continues to define the search query or selects one or more generated results. In some embodiments both users may be presented one or more keywords and/or digital image that could suggest search terms and/or results to one or more users.

Figure 3D:
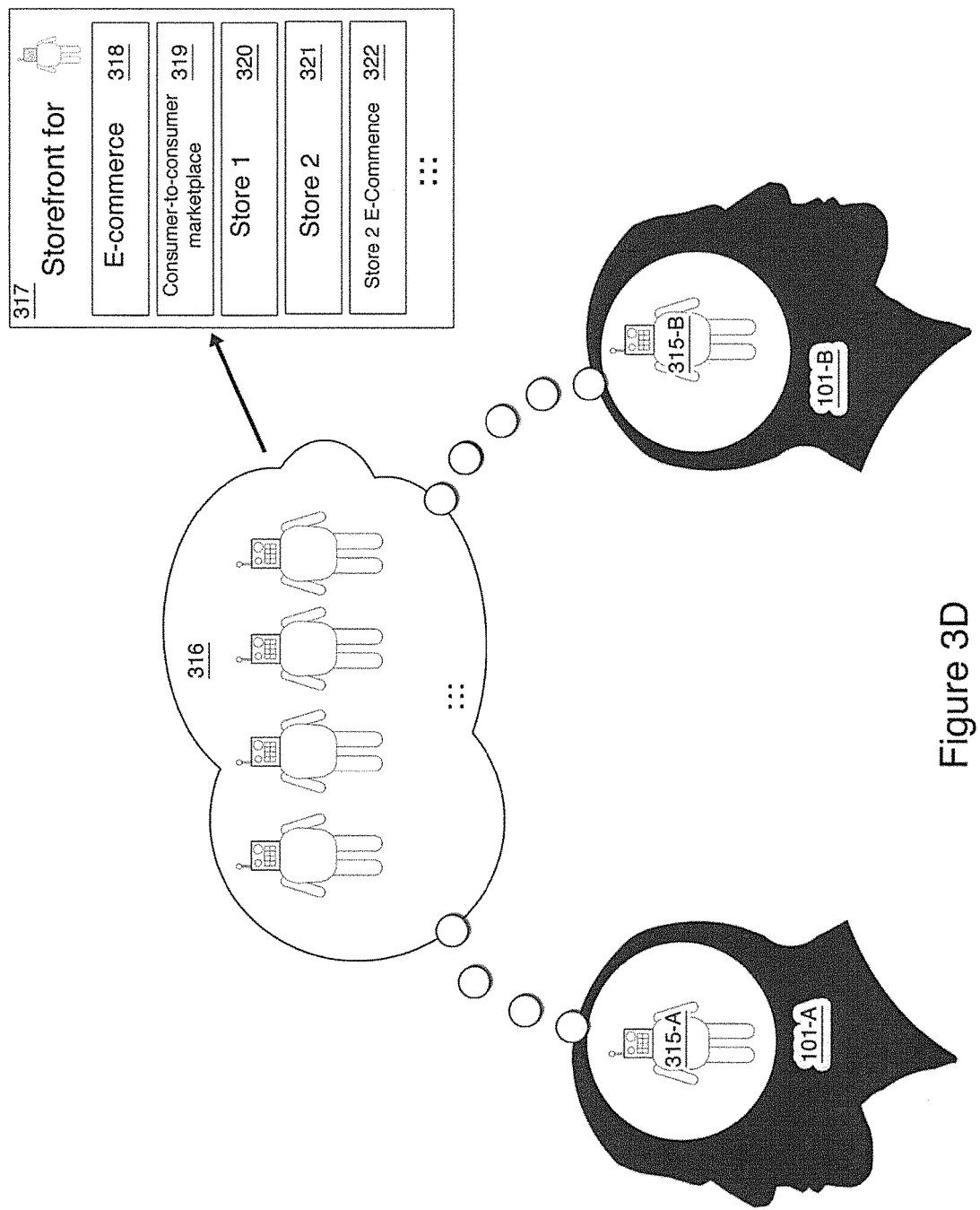
FIG. 3D illustrates one or more users reaching the identical and/or similar results comprising of storefront from search queries of a product.

FIG. 3D illustrates how users of user devices 101-A, 101-B have in mind one or more thoughts of similar and/or identical product 315-A, 315-B the said users are looking for, whereby searching for the product 316 through a web search engine both users could select the same results 317. In some embodiment the product that one or more users 101-A, 101-B are looking for is toy 315-A, 315-B, more specifically a toy robot 316 whereby through a web search engine, said users may be presented with one or more results where the said user continues to define the search query or selects one or more generated results 317. Additionally the web search engine could generate suggestions and/or results to narrow the results of search query as a result creating a search performed by one or more users to be more accurate and/or in context enhancing relevance and reaching results for the search quicker. In some embodiments users could be presented with a storefront display 317 for the results of the search whereby a user have used suggestions 316. More specifically the toy robot can be found at various online and local retailers 318, 319, 320, 321, and 322 while also indicating price, availability, deals etc. The said example could also be used with a plethora and plurality while not limited to objects, products, businesses, restaurants, people, food, documents, schools, places and/or interests.

Figure 3E:
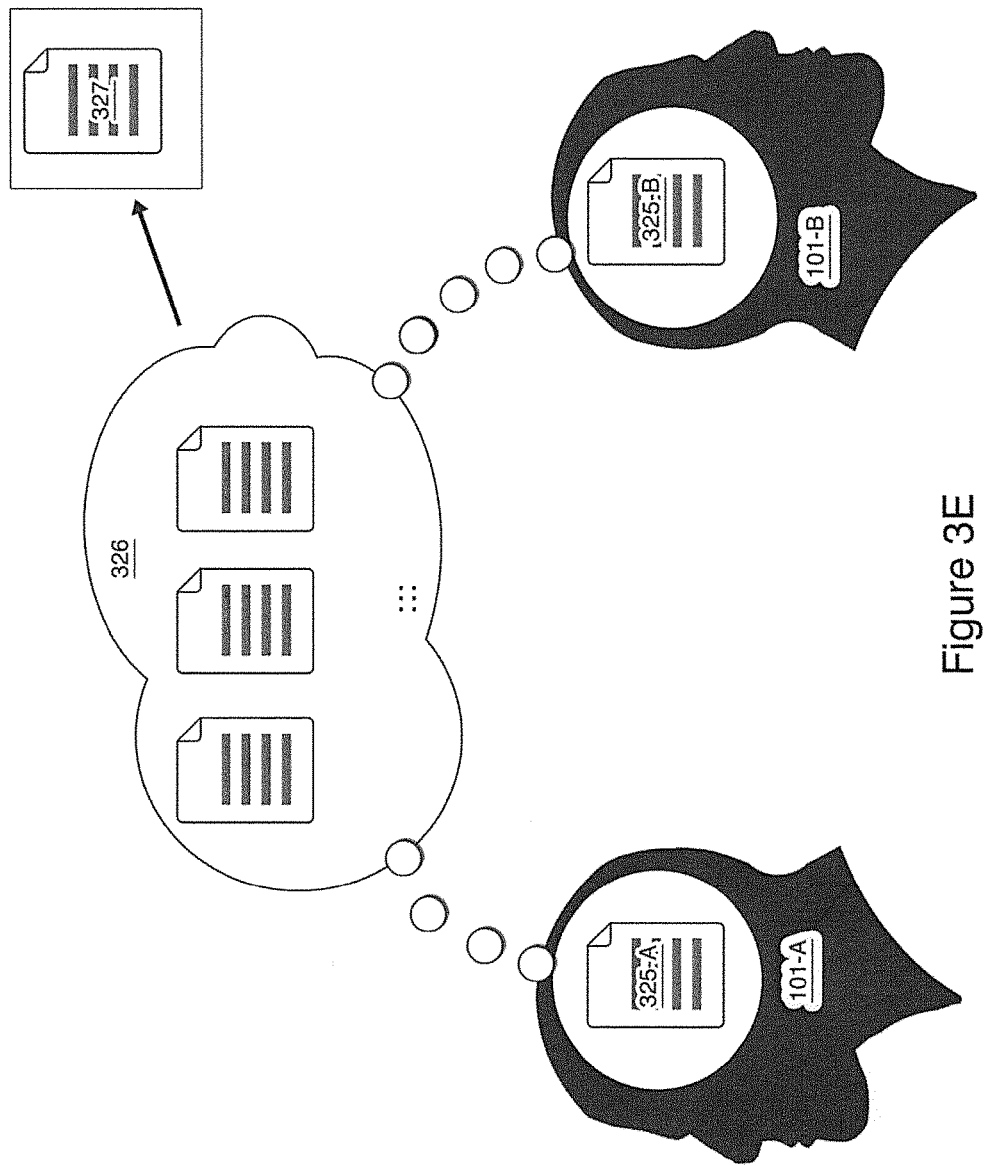
FIG. 3E illustrates one or more users reaching the identical and/or similar results from search queries of document and/or publication.

FIG. 3E illustrates how users of user devices 101-A, 101-B have in mind one or more thoughts of similar and/or identical product 325-A, 325-B the said users are looking for, whereby searching for a document 326 (such as a pdf file, a word processing document, or a spreadsheet) through a web search engine both users could select the same results 327. In some embodiment the document that one or more users are looking for is publication, more specifically an educational publication whereby through a web search engine, said users may be presented with one or more results where the said user continues to define the search query or selects one or more generated results 327. Additionally the web search engine could generate suggestions and/or results to narrow the results of search query as a result creating a search performed by one or more users to be more accurate and/or in context enhancing relevance and reaching results for the search quicker. Other examples may include summarization of documents so that users can reach the more relevant results and to hasten transfer of information.

Figure 3F:
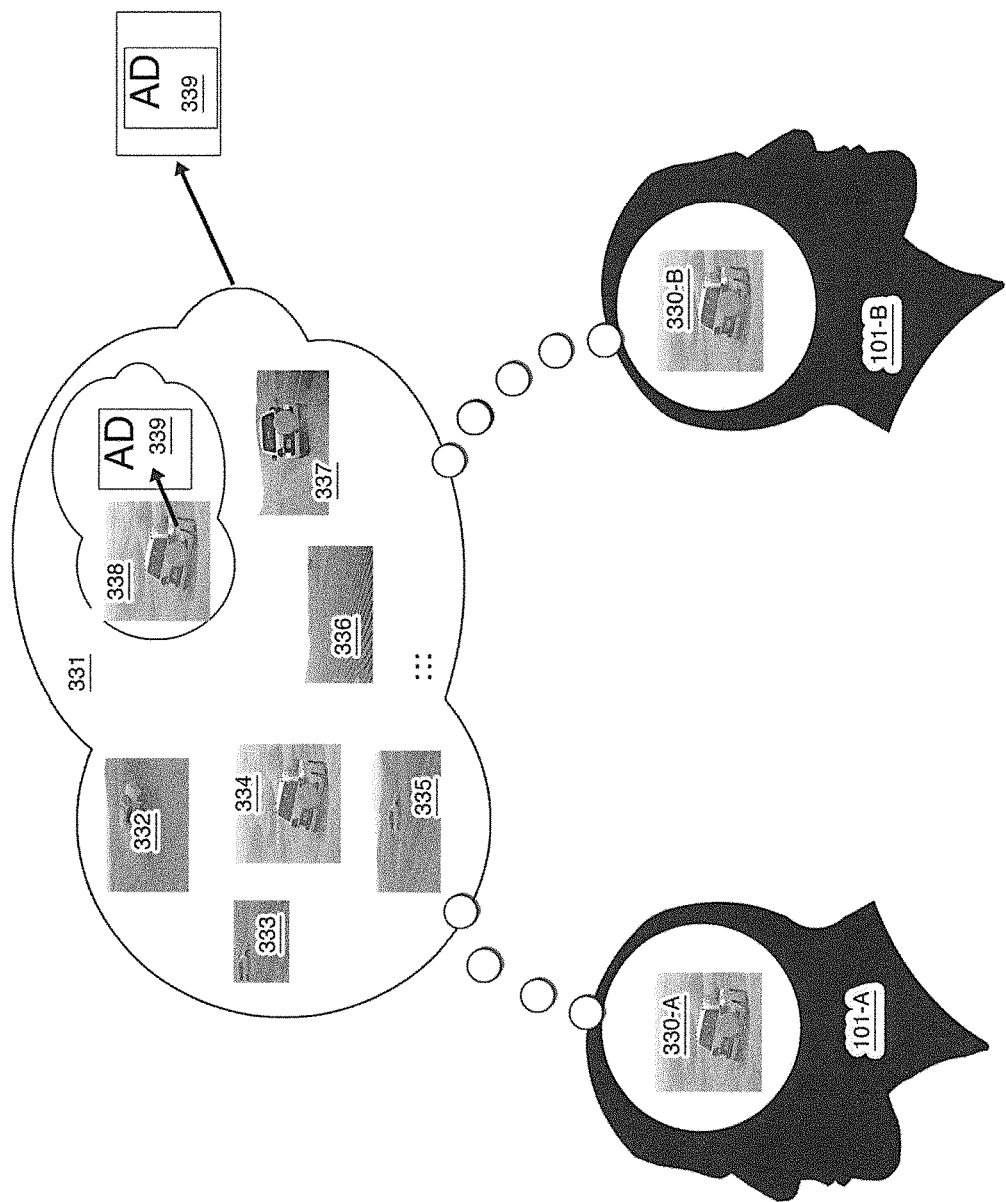
FIG. 3F illustrates one or more users reaching the identical and/or similar results from search queries of destination activity.

FIG. 3F illustrates how users of user devices 101-A, 101-B have in mind one or more thoughts of similar and/or identical type of activity/destination 330-A, 330-B the said users are looking for, whereby searching for an activity destination 331 through a web search engine both users could select the same results and/or similar result 339. In some embodiment the product that one or more users are looking for is traveling and activities, more specifically a desert excursion in Dubai whereby through a web search engine, said users may be presented with one or more results 332, 333, 334, 335, 336, 337, 338 where the said user continues to define the search query or selects one or more generated results 339. Additionally the web search engine could generate suggestions and/or results to narrow the results of search query as a result creating a search performed by one or more users 101-A, 101-B to be more accurate and/or in context enhancing relevance and reaching results for the search quicker. In some embodiments the selected suggestion and/or results is an advertisement 339 whereby the user may have used a suggested image 338 where the best and/or selected result was an AD advertisement 339. In some examples the advertisement could be booked immediately in real time. Other examples could be fashion where a user is looking for a product more specifically a pair of shoes.

The methodology may determine relevancy (and one understanding of digital data is served) between various digital media. Understanding the link or correlation between digital media can effectively aid in serving users features, information, advertisements, and deals whereby creating and having a strong correlation. The methodology can process and derive digital data to come up with a number of supporting information (from manual association, album, automatic recognition, location, etc.) whether a user is viewing their own images, or a website, or another users (in social web or not). The methodology creates the ability to provide interaction of associations throughout digital media. One example relates to viewing a photo from a user device 101 where a user is presented the Dubai Desert image. Additionally identified associations could learn more about Dubai Deserts that may provide additional information and a vehicle that would link to online video of the vehicle or search results of the vehicle (possibly with more relevance in deserts). In some embodiments the user may be presented with an advertisements and or a deal that may incentivize the user to click, where an airline is offering deals to Dubai where the advertisement is taking the associations and bringing to the user to take advantage of, where the photo originated from another user or the web and in this case the user view wants to have the experience in the photo. In some embodiments a user could be viewing a photo see the dessert and enter into a contest to win a trip or a company advertisement related to something a user might want to do.

Figure 4:
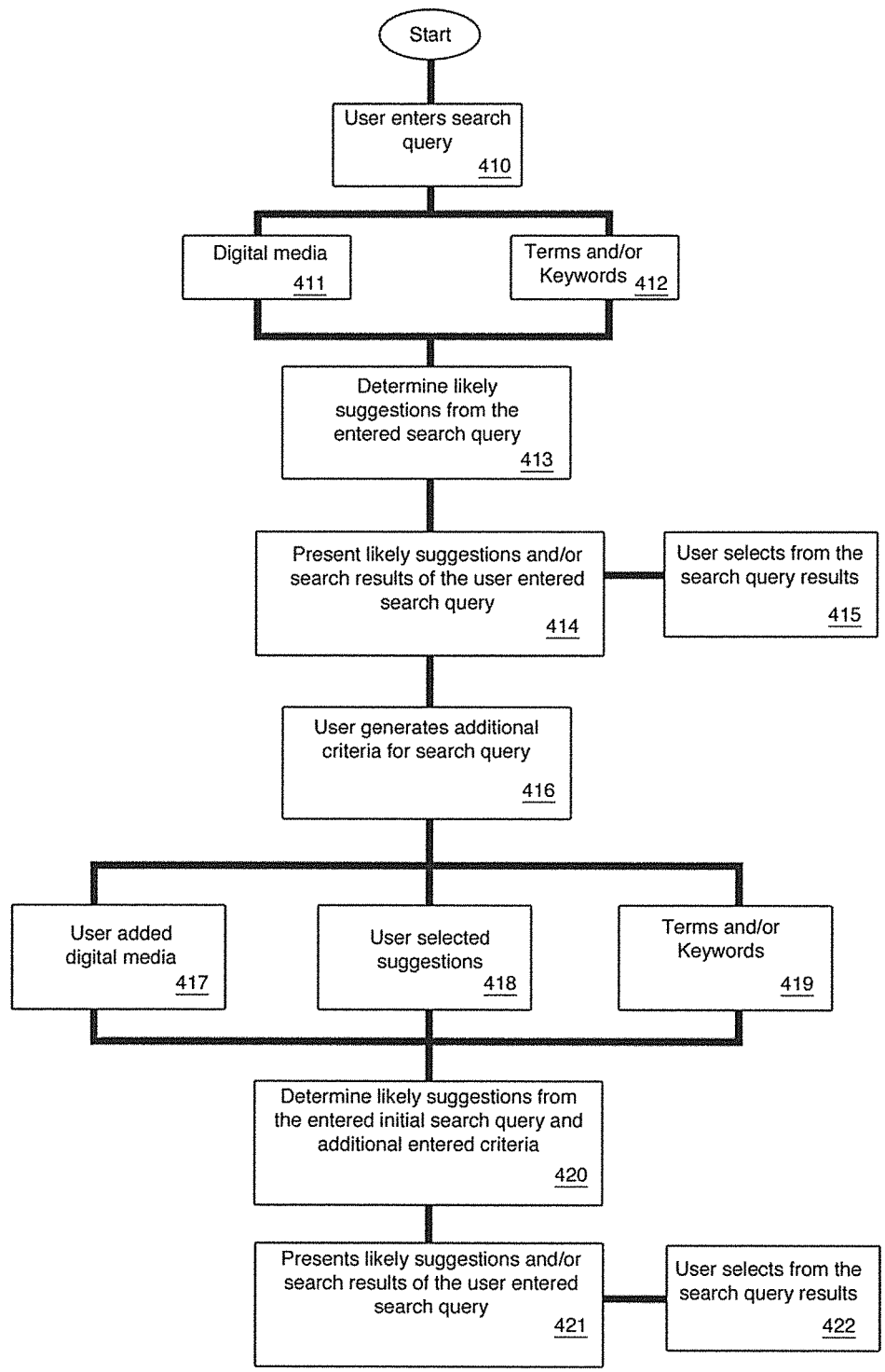
FIG. 4 is a flow chart of a process that responds to a user entering search queries to a web search engine.

FIG. 4 comprises a flow chart illustrating operation of the programming on the user device 101, the web search engine 102 and/or the server system 103 for the process or methodology for generating responses to search queries including the generation of suggestions for further refining searches. The process begins at a block 410 when a user could enter a search query 410. The search query may comprising selecting digital media 411 (digital photos, digital video, digital sound, documents) and/or a user entered query 412 (keywords, terms, Boolean commands). With the aid of the server system 103 the web search engine 102 determines likely suggestions 413 from the entered search query. The system presents likely suggestions and/or search results for the user entered search query at 414 to the user device 101. The user can select 415 from the result and/or suggestions or the user may add search criteria 416 to the initial search to further specify and narrow search results. The user may then add digital media 417 use one or more generated and presented suggestions 418 and/or enter keywords and/or terms 419. In some embodiments the web search engine 102 then determines one or more likely suggestions 420 from the entered initial search query and additional entered criteria whereby generating and presenting (outputting) likely suggestions 421 and/or search results for the user entered search query. The user can select from the results 422 and/or suggestions or the user may add search criteria to the initial search to further specify and narrow search results. The said user could start a new search or reset the process at any time during the user's interactions with the web search engine 102.

FIGS. 5A-5D illustrate an example of the process described relative to FIG. 4 using a website having a toolbar search box 500. The user can type keywords, or the like, into the box 500 in any known manner or select digital media that is entered in the box 500. The search query is then implemented by selecting the icon 501. The website also includes a link 502 for uploading search photos, an explore link 503 and a Sign in link 504.

Figure 5A:
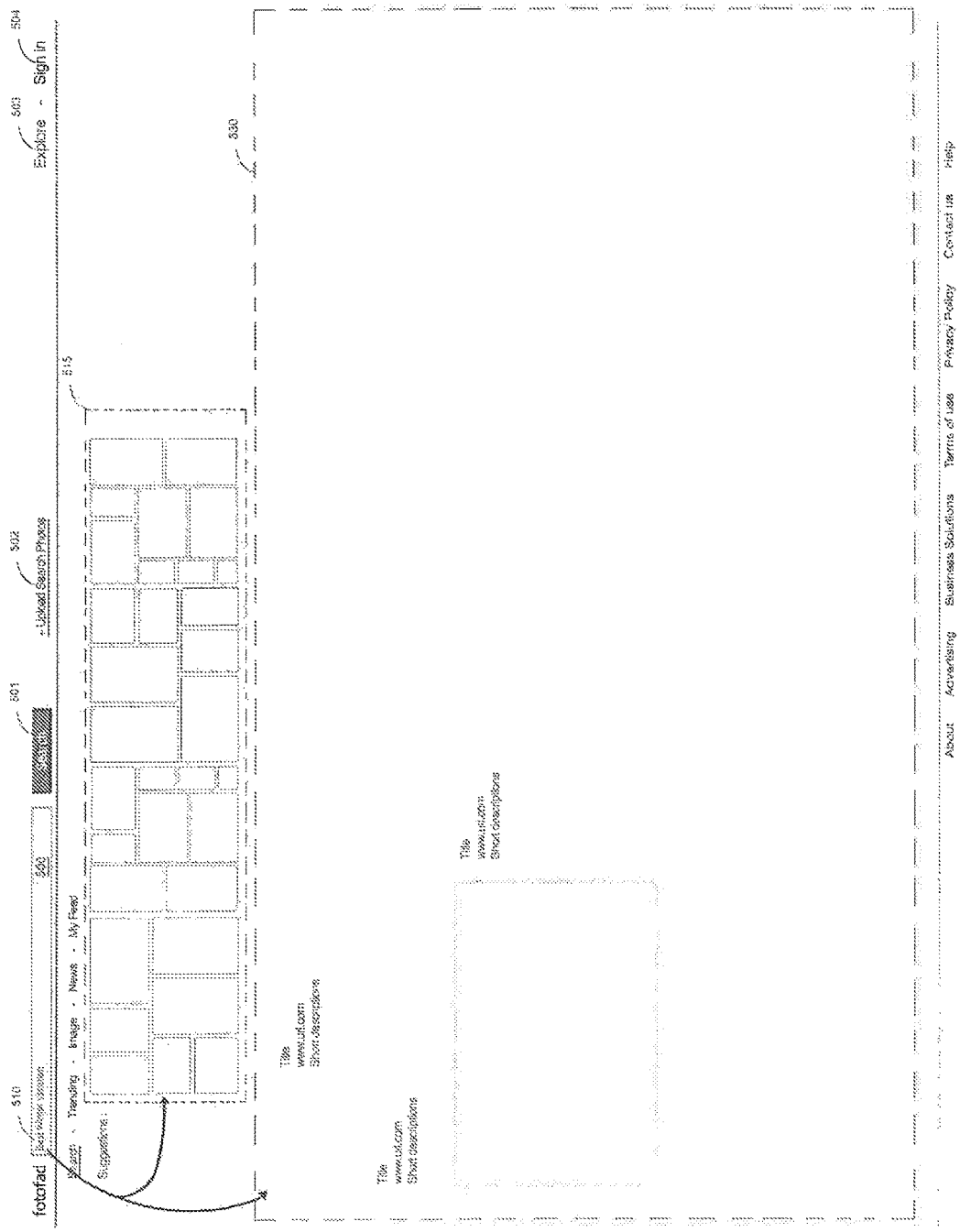
FIGS. 5A-5G shows an example of a website service, application, user interface where a user searches whereby generating suggestions and results.
Figure 5B:
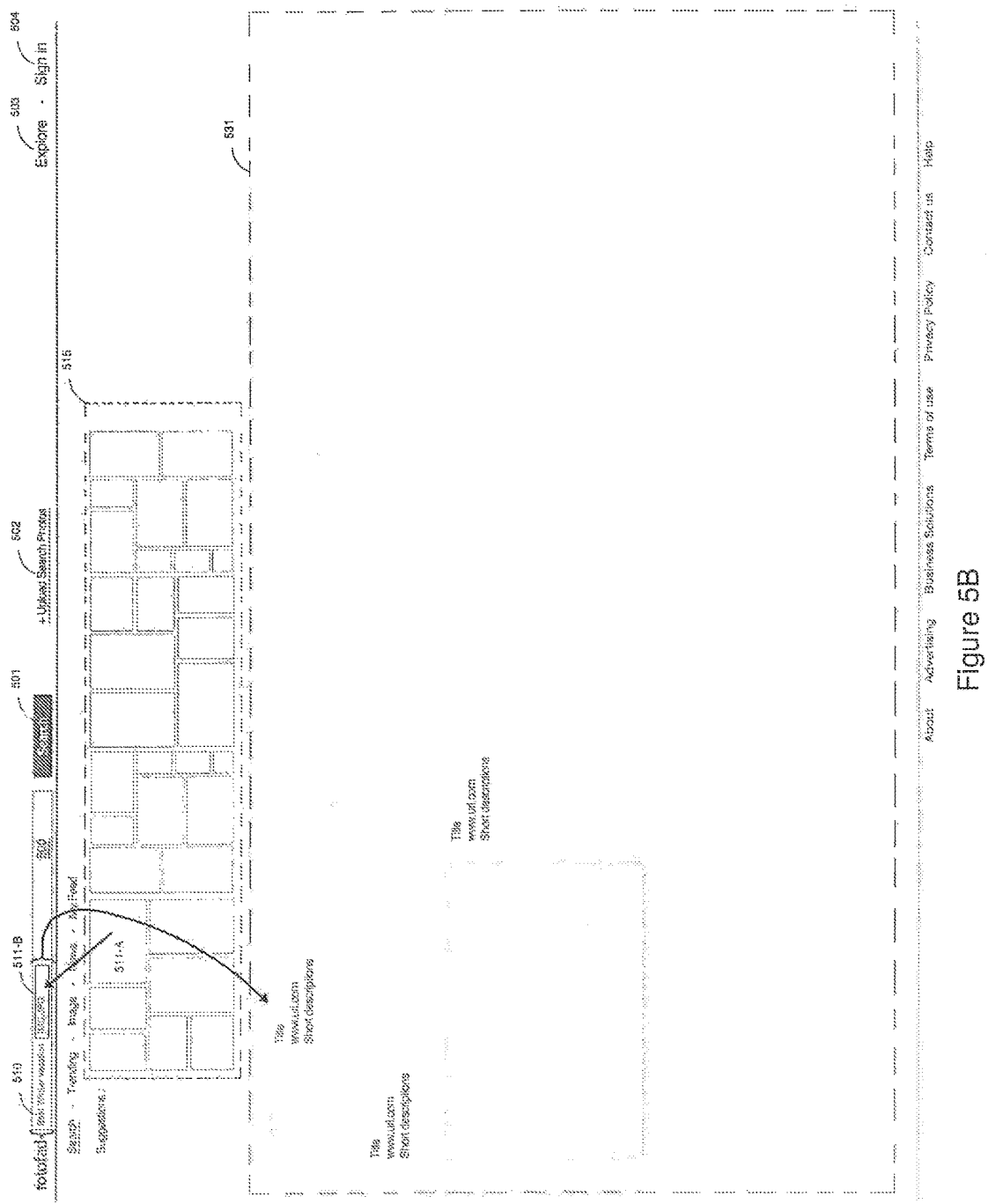

In the illustrated example, one or more digital media and/or keywords 510 are entered in the box 500 for the search being performed on the user device 101. Suggestions 515 and/or results 530 are generated from the search query and displayed on the website. In FIG. 5B, the user may then select a suggestion 511-A generated from the initial search query 510. The selected suggestion is then included as 511-B in the search box 500 along with the initial search query. Using the combination of the query and the suggestion the user is presented with an updated result that may include one or more additional generated suggestions. The user may further continue the search with additional queries and/or digital media, updating a users result. From the initial search a user may use digital media or queries in any language whereby the following suggestions may include digital media and/or keywords. Any additional search criteria may comprise of keywords, text and/or digital media. The webpage may also contain advertisements. Additionally at any time suggestions may be used to aid or replace the search.

Figure 5C:
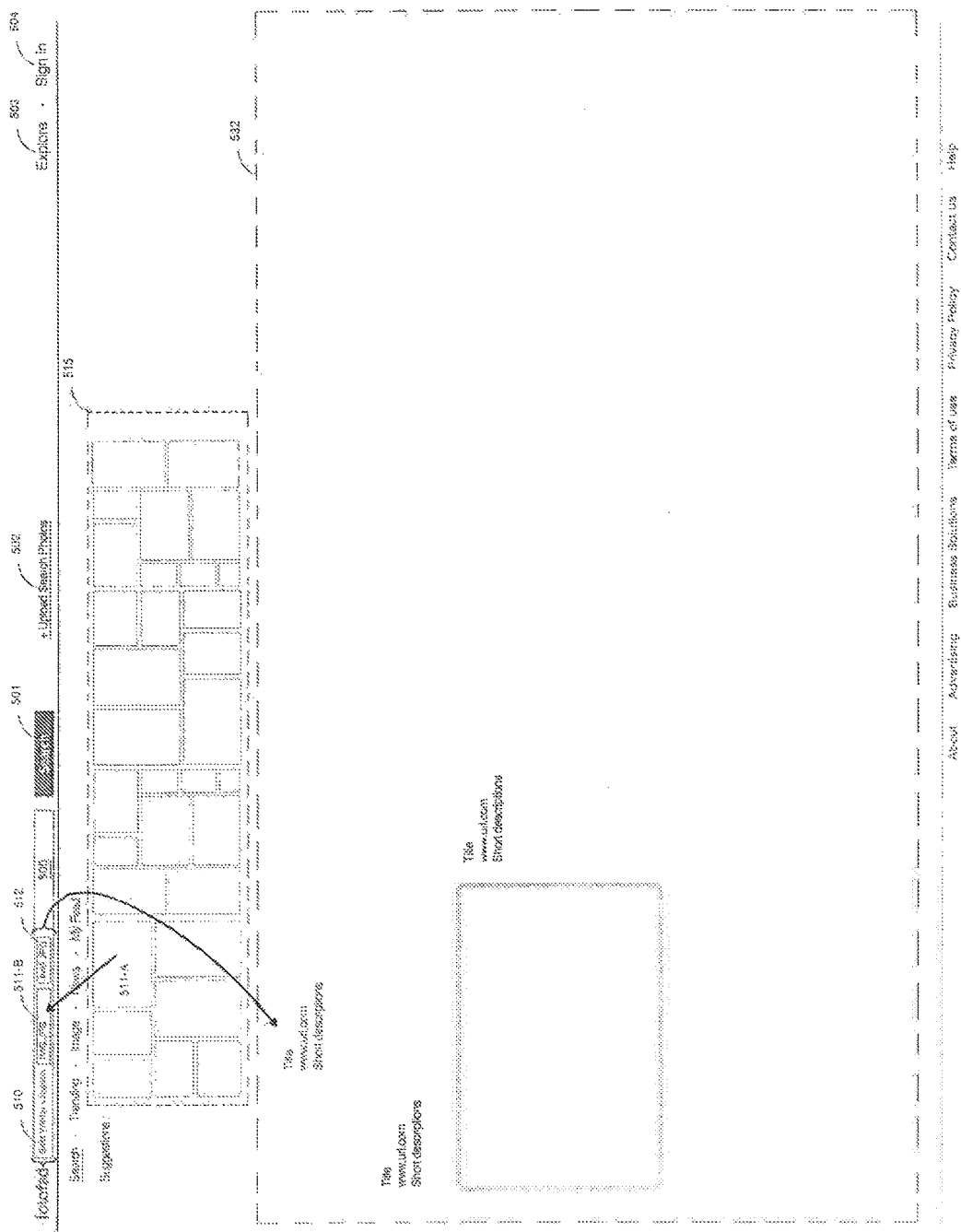
Figure 5D:
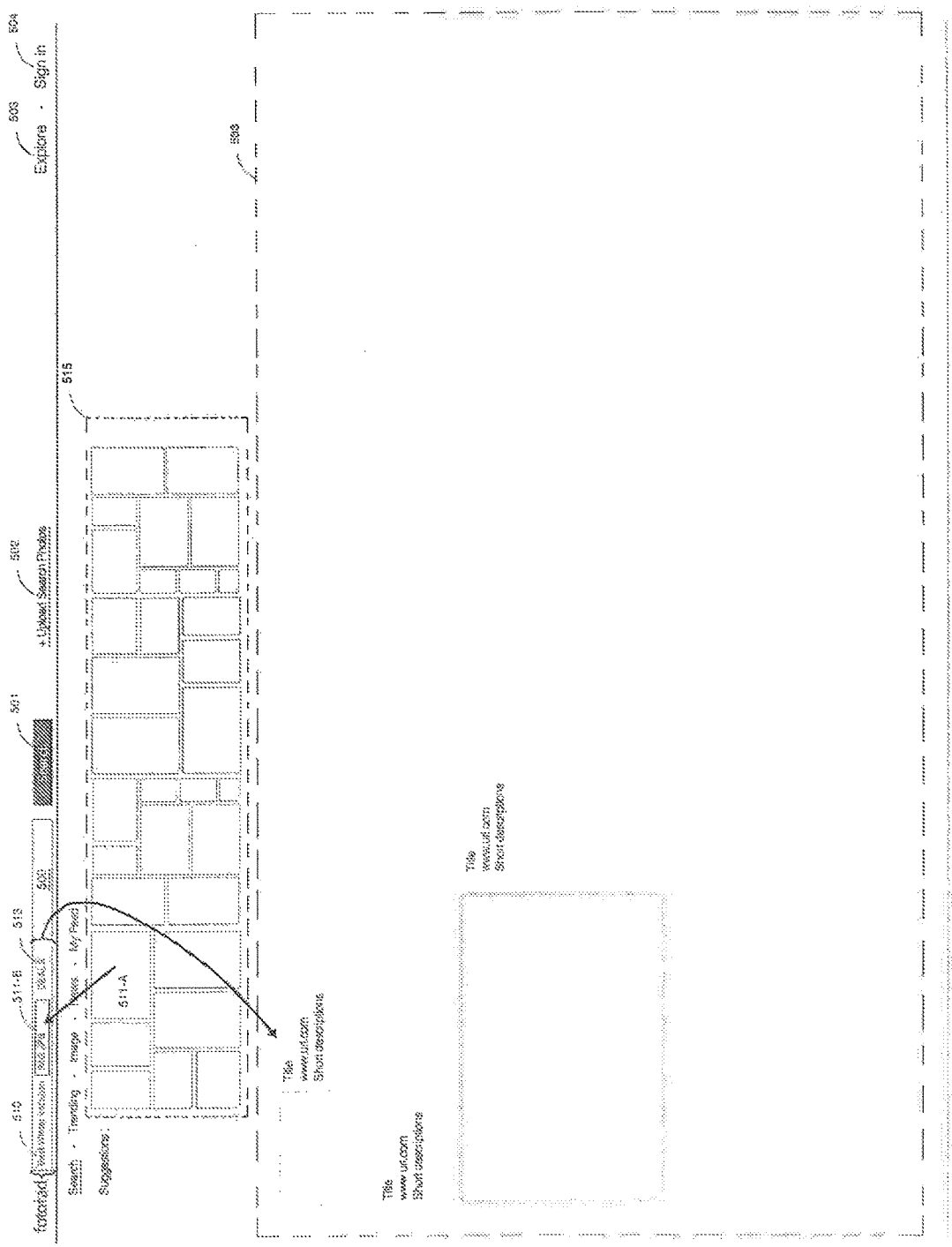

FIG. 5C additionally shows keyword search 510, with the use of suggestions 511-B and an image 512 provided by the user. Using the combination of the query and the suggestion and the image the user is presented with an updated result that may include one or more additional generated suggestions. Particularly, the search is generated, scored, stored, ranked and the results are output to the user and may include one or more new suggestions. Other example may include keyword search, with the use of suggestions and a keywords from the user.

In some embodiments, words displayed in an advertisement or the like relating to a special could indicate best price or using in-house or third-party application/components to further assist users with search results. These deals could be included with the process. The user could select this deal as indicated by the DEALS icon 513 entered into the search box 500 in FIG. 5D. Additionally keywords/Boolean keywords may aid in finding the best results for user, for example using FIG. 3C where a user searches for a "Brand X shirt" and the user could also add "NOT RED" to exclude all the red shirts where by the suggestions and/or search results would exclude one or more red shirt and may remove all the red shirts from the suggestions and/or search results. Using the same embodiment in FIG. 3C a user searches for an "Brand X shirt" an image of an Brand X shirt and the user could also add "NOT" and another image of a black or Brand Y shirt to exclude all the black and Brand Y shirts where by the suggestions and/or search results would exclude one or more black and Brand Y shirt and may remove all the black and Brand Y shirts from the suggestions and/or search results.

Figure 5E:
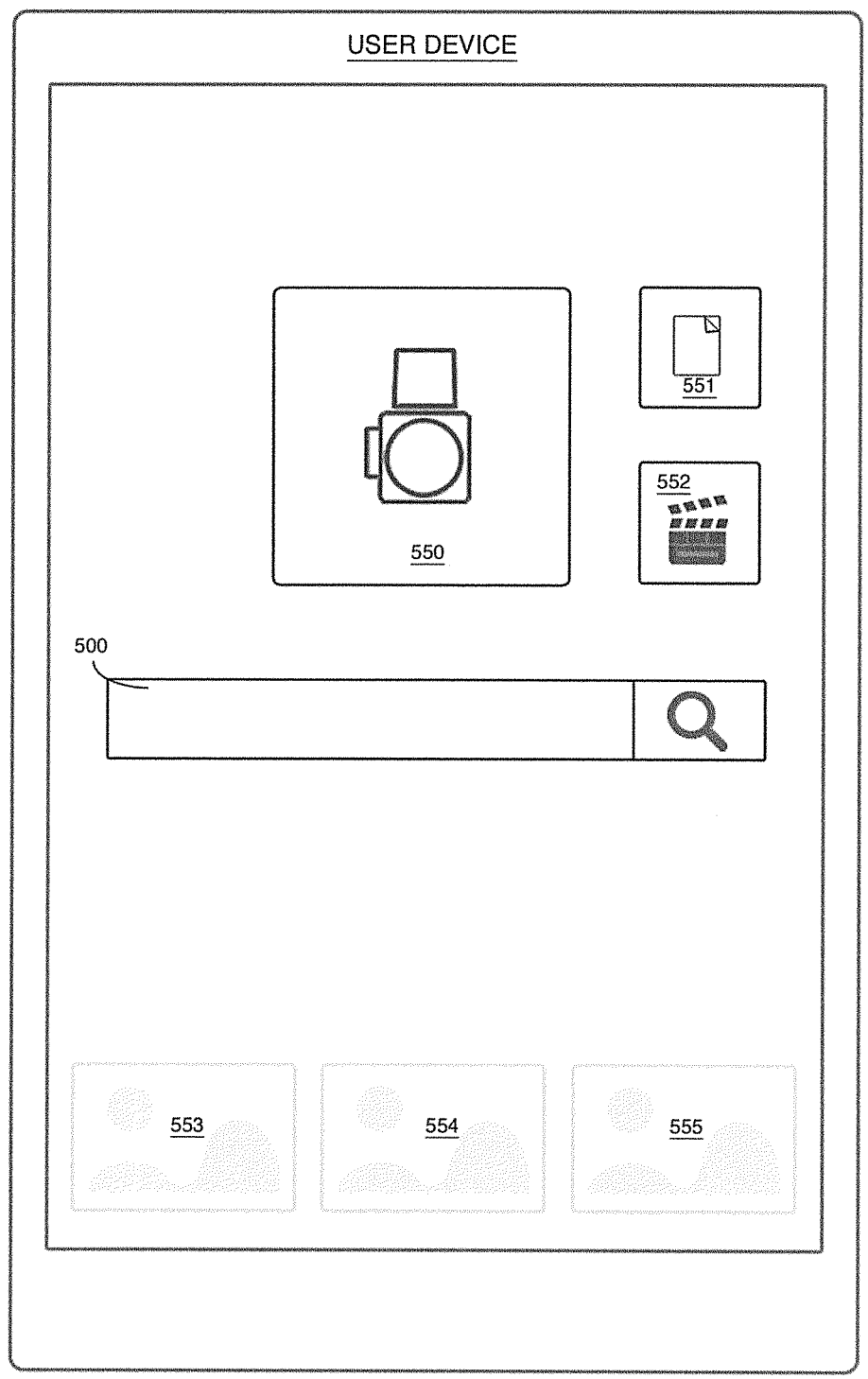

FIG. 5E shows an example of a website service that indexes material where a search using digital media is taking place on a user device 101. A user will be able to conduct a search on one or more images 550, documents 551, videos 552, etc. Each form of digital media 550-552 contains one or more association or identifications. In some embodiments various associations are identified automatically and/or manually. A user may also use keywords or description aiding in the search. In some embodiments a user will enter a query search and may be presented with images and/or images that are sized differently that are part of a search result or just top trending/feed. A user may also include keywords or digital media and/or parts of digital media in search. Additionally users may sign in and/or create an account.

Figure 5F:
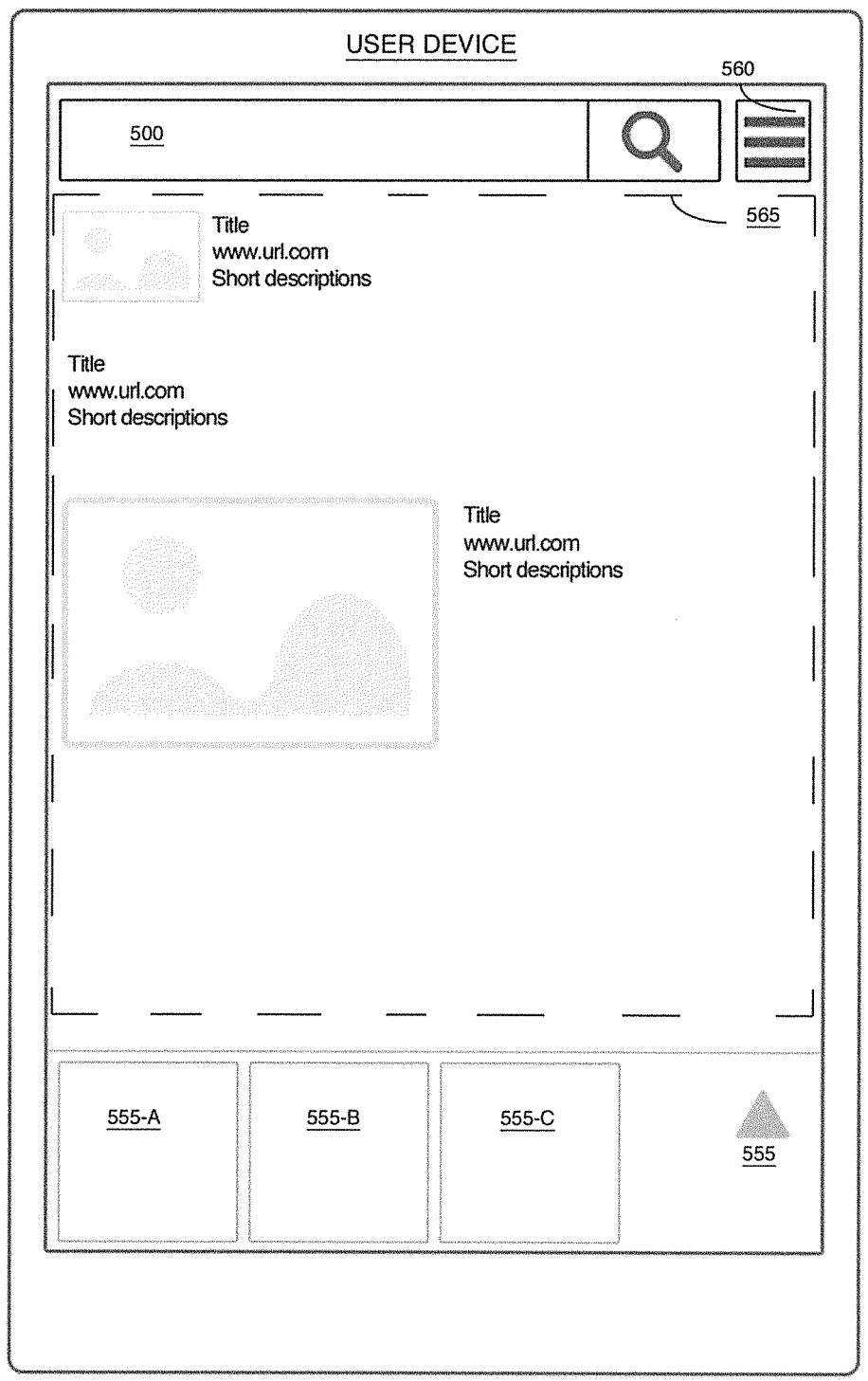

FIG. 5F shows another example of a website service that indexes material where a search using digital media is taking place on a user device 101. A user will be able to conduct a search 500 on one or more images, video, documents or by information, title and/or description. Keywords may be used to search and be presented or a user may have the ability to input data. A user may also remove one or more identified or associations from the search query. A user may be able to select through an organized menu 560 of media, while also including trending media, images, News, Feed, translation, offers, blog, shopping, photos, documents, videos, music, storage, search, settings and etc. A user may be able to browse digital media on a user device and create a query. A user may also use keywords or description aiding in the search. In some embodiments the user may be presented suggestions 555-A, 555-B, 555-C that are sized differently that are part of a search result 565 or top trending/feed where a user could search and/or use in the search query 500. Additionally users may sign in and/or create an account.

Figure 5G:
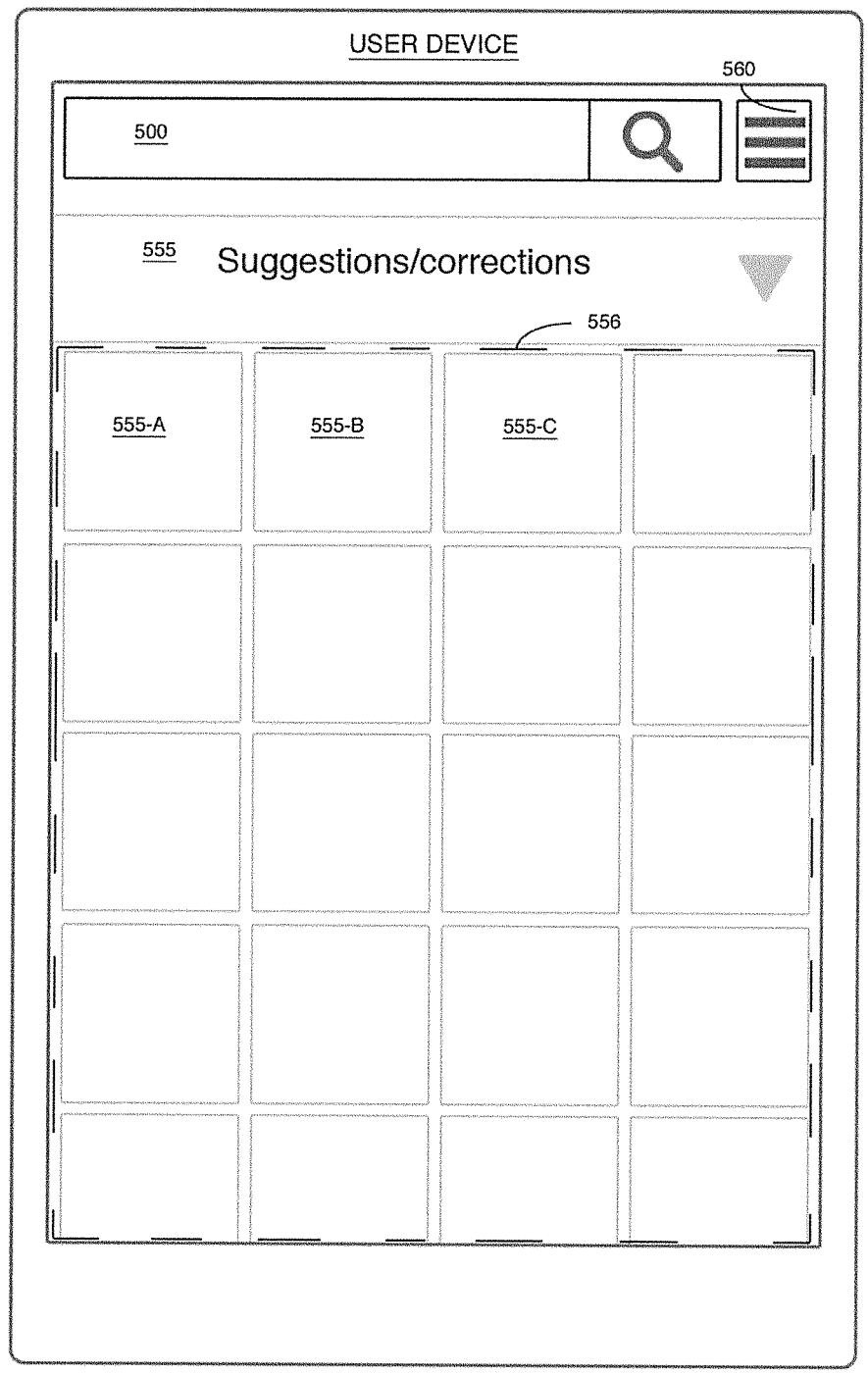

FIG. 5G shows an example of a website service that indexes material where a search using digital media is taking place on a user device 101. A user will be able to conduct a search 500 on one or more images, video, documents or by information, title, description, and keywords may be used to search and be presented or a user may have the ability to input data. The user is presented with one or more suggestions 556 and/or results the user could select and/or use to further aid in refining the user search query.

Figure 6A:
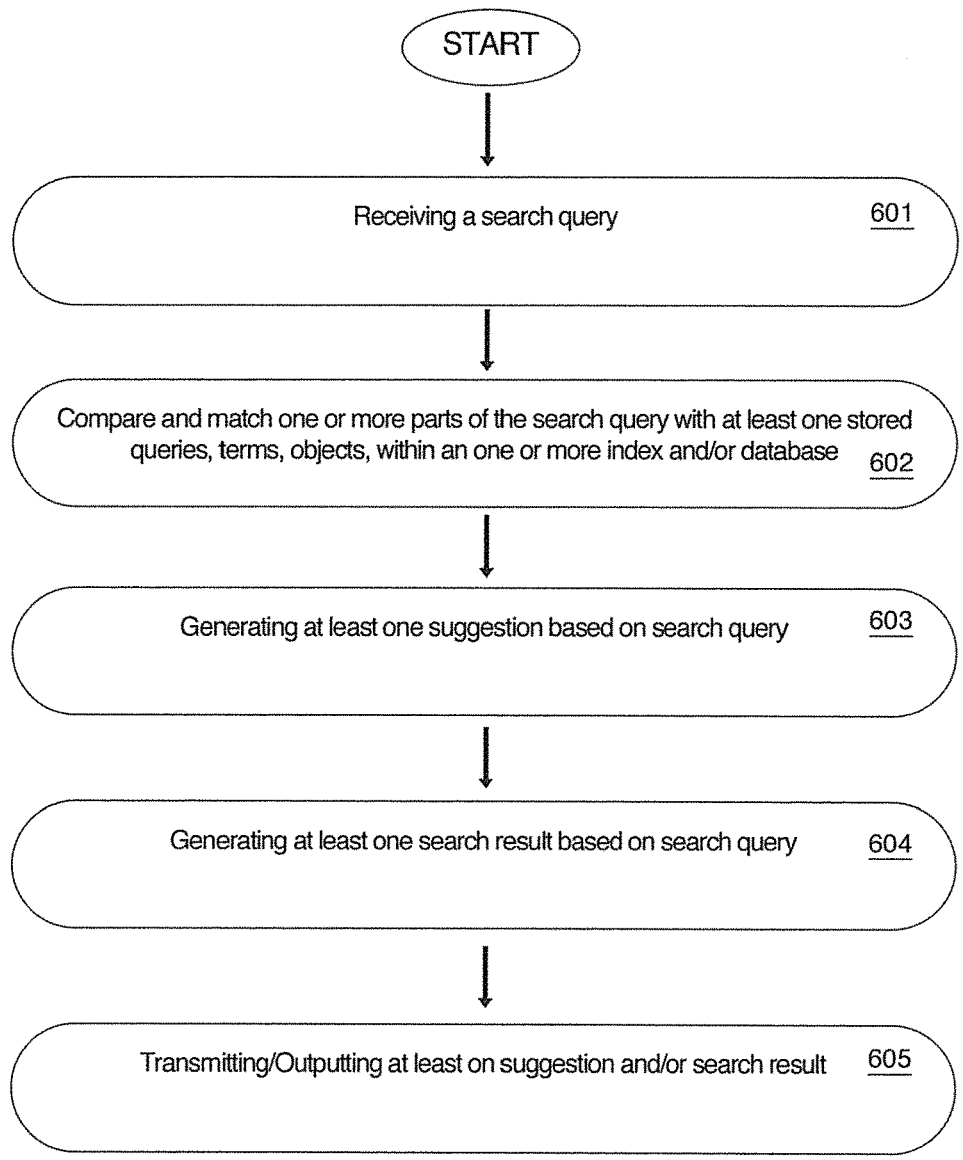
FIGS. 6A-6E illustrates a flow diagram where a server system receives and transmits a search query, one or more parts of search queries, suggestions and/or result.

FIG. 6A illustrates a flow diagram where the server system 103 receives a search query. In some embodiments the server system 103 compares and matches one or more parts of the search query with at least one stored queries, terms, objects, within a one or more index and/or database 104 at a block 602. The sever system 103 could generating at least one suggestion based on search query as at 603, at least one search result based on search query as at 604, and then transmitting and/or outputting to the user device 101 at least one suggestion and/or search result at 605.

Figure 6B:
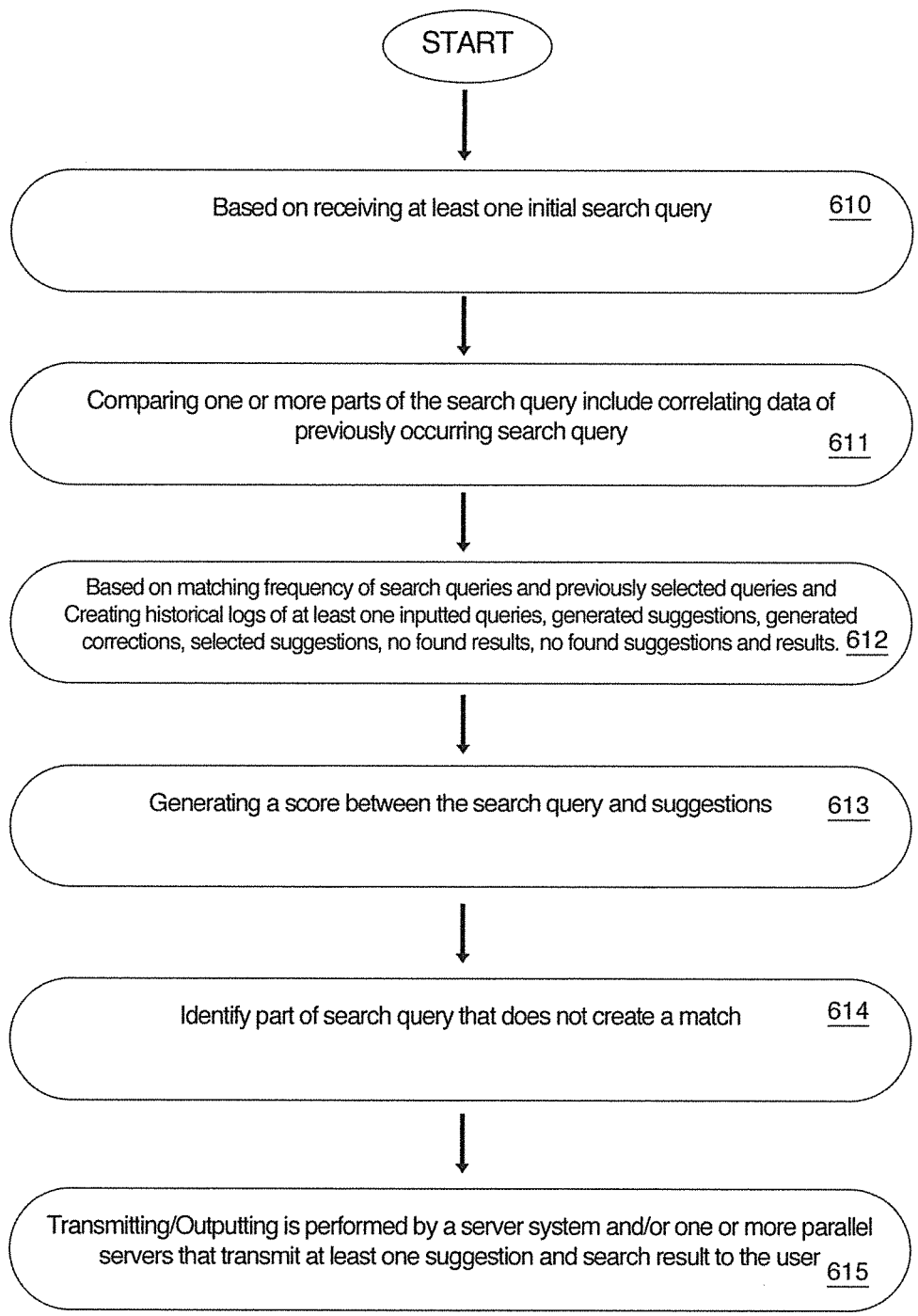

FIG. 6B illustrates another flow diagram where the server system 103 receives an initial search query. In some embodiments the server system compares one or more parts of the search query and includes correlating data of previously occurring search query as at 611. Based on matching frequency of search queries and previously selected queries the server system 103 creates historical logs of at least one inputted queries, generated suggestions, generated corrections, selected suggestions, no found results, no found suggestions and results at 612. Furthermore the server system 103 generates a score between the search query and suggestions at 613 and identifies part of search query that does not create a match at 614. The server system 103 transmits and/or outputs at least one suggestion and search result to the user at 615.

Figure 6C:
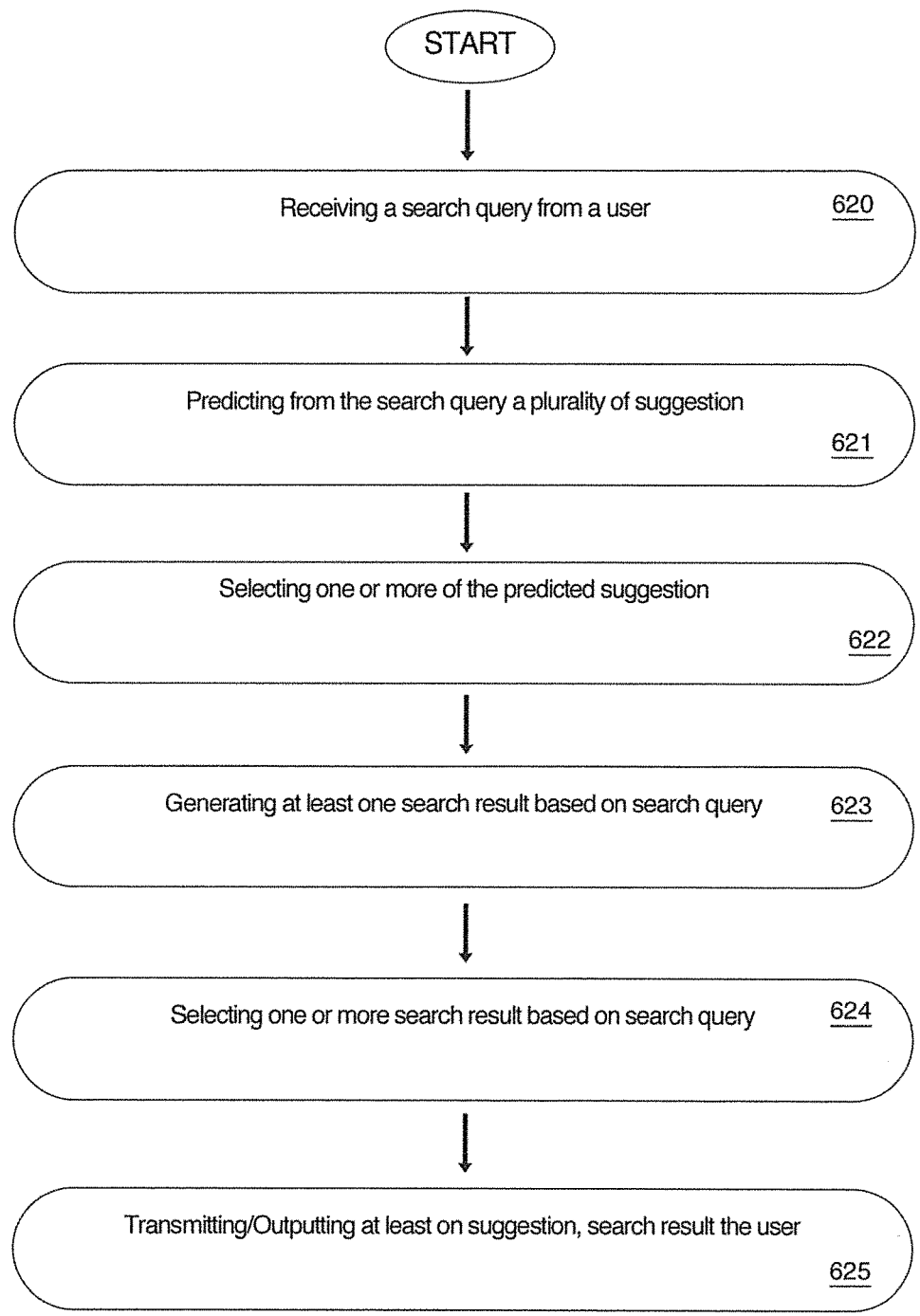

FIG. 6C illustrates a flow diagram where the server system 103 manages and/or processes search queries in response to receiving a search query from a user. The server system 103 may predict from the search query a plurality of suggestion at 621. The server system 103 subsequently may select one or more of the predicted suggestions at 622 and generate at least one search result based on the search query and predicted selection at 623. The server system 103 may select one or more search result based on the search query at 624 and transmit and/or output at least on suggestion or search result to the user at 625.

Figure 6D:
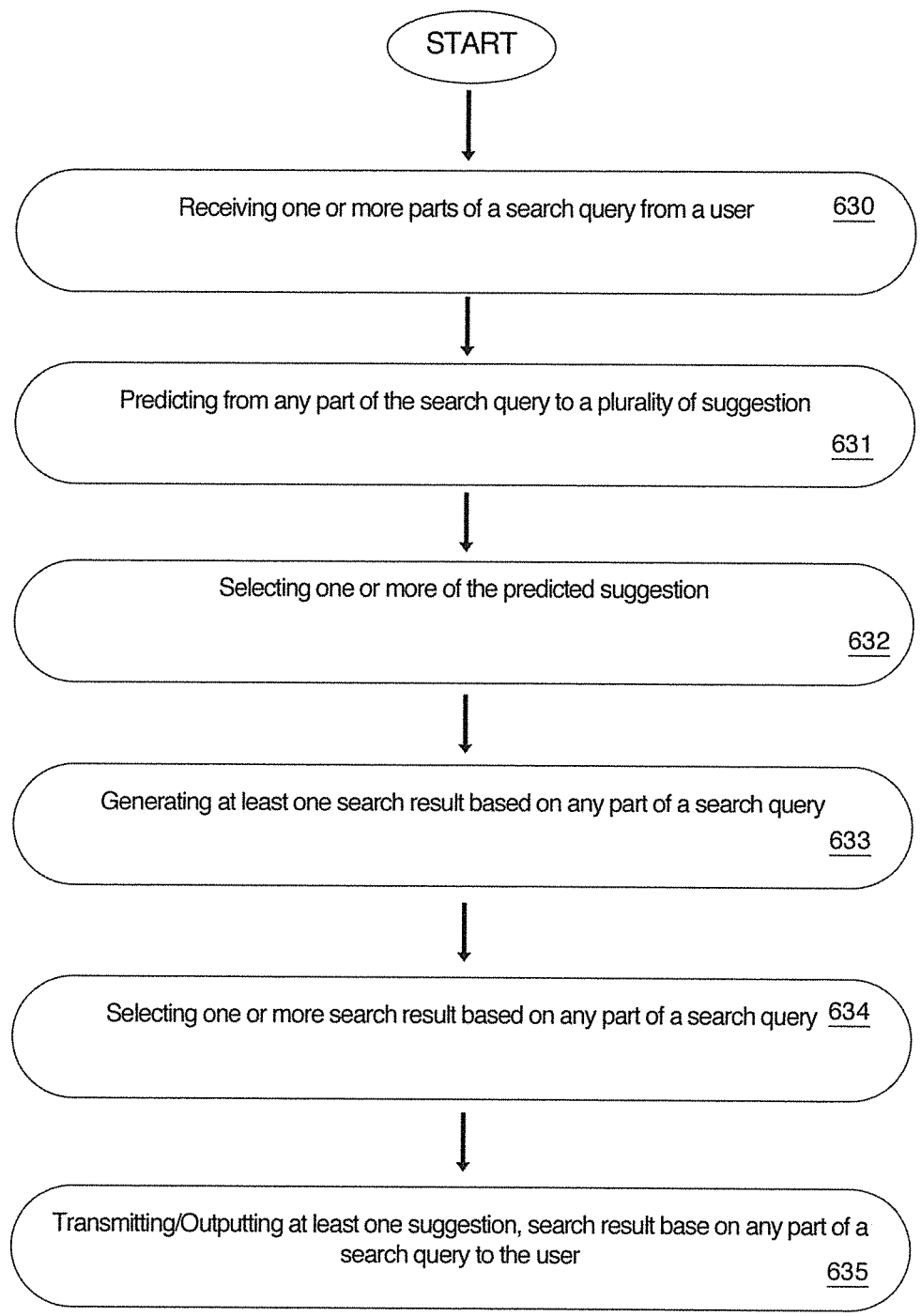

FIG. 6D illustrates a flow diagram where the server system 103 manages and/or processes search queries from receiving one or more parts of a search query from a user. The server system 103 predicts a plurality of suggestions from any part of the search query at 631. In some embodiments the server system 103 may select one or more of the predicted suggestions at 632. Furthermore the server system 103 generates at least one search result based on any part of a search query at 633 and select one or more search result based on any part of a search query at 634. The server system 103 transmits and/or outputs at least one suggestion and/or search result based on any part of a search query to the user at 635. In some embodiments, one or more suggestions and/or search results comprise one or more matching and/or predefined methods, models, and/or metrics.

Figure 6E:
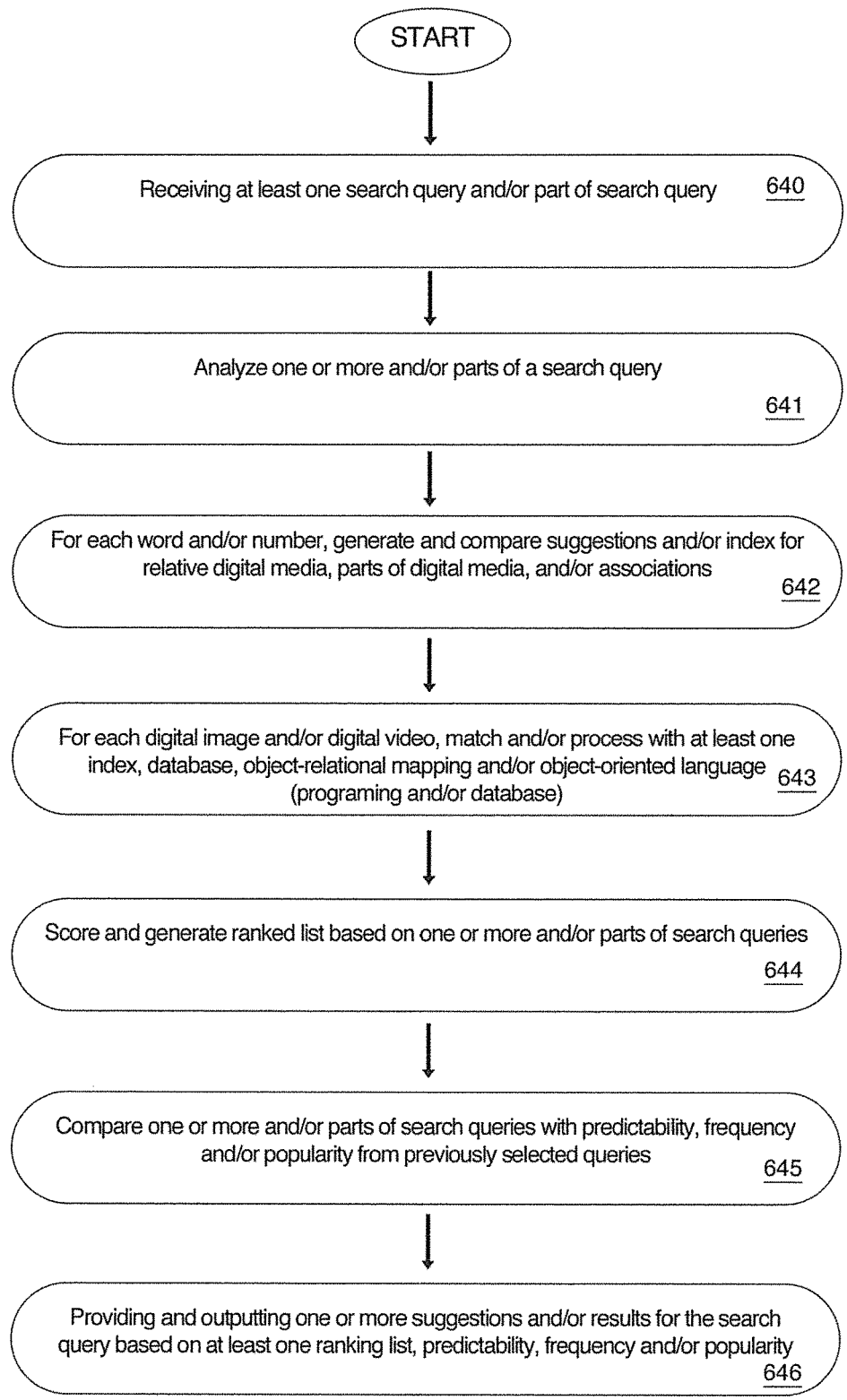

FIG. 6E illustrates a flow diagram for the server system 103 whereby suggestions and/or results are generated in response to one or more and/or parts of search queries received at 640 based on at least one ranking list, predictability, frequency and/or popularity. In some embodiments, the server system 103 may analyze one or more and/or parts of a search query at 641. For each word and/or number, the server system 103 generates and compares suggestions and/or indexes for relative digital media, parts of digital media, and/or associations at 642. The server system 103 matches and/or processes each digital image and/or digital video with at least one index, database, object-relational mapping and/or object-oriented language (programming and/or database) at 643. As a result the server system 103 creates and/or generates a score and ranked list based on one or more and/or parts of the search queries at 644. The server system 103 may compare one or more and/or parts of search queries with predictability, frequency and/or popularity from previously selected queries at 645. The server system 103 may deliver by transmitting/outputting one or more suggestions and/or results for the search query based on at least one ranking list, predictability, frequency and/or popularity to the user at 646.

In some embodiments, the output may include a frequency and/or popularity based on the total number of occurrences. In some instances digital media include one or more digital image, digital video, digital sound, document, and/or publication and may include one or more and/or combination of parts of digital media include one or more parts of digital image, parts of digital video, parts of digital sound, parts of document, and/or parts of publication. Furthermore, associations may include identified, similar to, and/or parts of digital media. As a result the server system 103 may score and generate ranked list based on one or more matched digital media, parts of digital media, and/or associations. In some embodiments the server system 103 may store one or more scores, ranked list, predictability, matches, frequency and/or popularity from previously selected queries in one or more databases. The server system may transmit, present and/or outputting one or more suggestions and/or results containing at least one match digital media, parts of digital media, and/or associations.

Also, the server system 103 could generate and/or create values based on search queries for every suggestion, and predict and determine likely suggestions that would generate a result based on a search query and/or generated values. In response to predicting and determining likely suggestions the server system 103 may generate one or more suggestions to be outputted. Examples of suggestion may comprise at least one and/or parts of keywords, tags, digital image, digital video, digital sound, terms and links. In some embodiments suggestions could be the result of and generate more than one and/or a combination of results based on first and/or second search queries while also including rewriting the search query from the suggestions. The server system 103 could include at least one user origin, profile, native language, social relationship, language, inputted language, traits, characteristics and/or cultures effect one or more web search engine, server system, suggestion and/or search results whereby suggestions and/or results comprise are ruled by at least one subscription, social relationship, profile settings, or characteristic. In some embodiments this also includes determining a user proximity and/or location to at least one search result and/or search query. The server system 103 may also store any part of the user search query and use any part of the stored user search query and include updating user predictability for one or more interests and/or suggestions. Further the server system 103 may update user predictability for one or more interests and/or suggestions based on at least one of characteristics, query history, device characteristics, application characteristic, buying history, demographics, traits, language, location, proximity, results history and/or selection history of suggestions and results. The search results could include at least one generic search result and/or generic suggestion. Also, search results could be one or more advertisements that may or may not be impacted by the search query and/or suggestions.

In some embodiments a user inputs a query made up of keywords, digital media, parts of digital media, and association. The server system 103 may automatically create visual content descriptors and feature vectors. At the same time the server system 103 may attempt to find similarities and/or compare databases that may or may not include digital media, parts of digital media, and association with visual content descriptors and feature vectors. The server system 103 may index one or more found similarities and compare and generate one or more results that are then output to the user. Additionally scores and/or ranking are created and/or updated for digital media, and associations for indexing and storing data, information, scores, and/or rankings.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Descriptors may include terms that capture the essence of the data, information, document, of digital media, parts of digital media, and association. In some embodiments descriptors may include words, phrases alphanumerical terms, hashtags, tags, metadata, proportions, one or more identifiers, and links. Whereby the data, information, of digital media, parts of digital media, and association is analyzed manually or automatically to extract descriptors that are indexed and/or stored in an index that may be used in one or more search queries.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer-implemented method within a server system for generating suggestions by a search engine in response to search queries, comprising:
   providing a database associated with the search engine, the database storing digital media items each selectively associated with at least one of queries, terms or objects;
   providing a user interface search display operatively associated with the search engine and operating on a user processing device, the user interface search display including a search query field for receiving a first search query from a user the first search query comprising a digital media query including a digital image, a digital video, a digital sound or a document;
   comparing one or more parts of the first search query with stored queries, terms or objects within the database to find matching digital media items;
   generating one or more suggestions based on the first search query, the suggestions comprising matching digital media items for modifying the first search query;
   generating at least one search result based on the first search query;
   the search engine transmitting an output to the user device for display on the user interface search display comprising the one or more suggestions and the at least one search result; and
   the user selecting one of the suggestions to modify the first search query and adding the matching digital media item of the selected suggestion to the first search query in the search query field and the search engine performing a second search using the first search query and the selected suggestion.

2. The method of claim 1, wherein suggestions comprise at least one of tags, digital ages, digital video, digital sounds and links, and further comprising:
   generating values based on search queries for every suggestion; and generating the at least one suggestion comprises predicting and determining likely suggestions that would generate a result based on search query and/or generated values.

3. The method of claim 1, wherein the search engine performing the second search comprises:
   based on the first query, generate one or more values for at least one of the user selected suggestion and search results that comprise of at least one keyword, tag, digital image, digital video, digital sound, terms and links;
   generating at least one second suggestion based on the second search query;
   generating at least one second search result based on the second search query;
   the search engine transmitting an output to the user device comprising the at least one second suggestion and the second search result.

4. The method of claim 3, whereby the use of the output and the first query may include rewriting the search query.

5. The method of claim 1, where at least one user origin, profile, native language, social relationship, language, inputted language, traits, characteristics or cultures are used to generate the at least suggestion or the at least one search result.

6. The method of claim 1, wherein the at least one suggestion and search result results comprises an advertisement.

7. The method of claim 1, wherein the at least one suggestion and search result results are determined by at least one subscription, social relationship, profile settings, or characteristic.

8. The method of claim 1, further comprising storing any part of the received search query.

9. The method of claim 8, whereby storing any part of the user search query includes updating user predictability for one or more interests or suggestions.

10. The method of claim 9, whereby updating user predictability for one or more interests or suggestions are based on at least one characteristic, query history, device characteristic, application characteristic, buying history, demographic, trait, language, location, proximity, results history and/or selection history of suggestions and results.

11. The method of claim 1, further comprising determining user proximity or location.

12. The method of claim 11, wherein the at least one suggestion and search result are determined by user proximity or location.

13. A computer implemented method using a server system for managing and processing search queries, comprising:
providing a user interface search display operating on a user processing device, the user interface search display including a search query field for receiving an initial search query from a user, the initial search query comprising a digital media query including a digital image, a digital video, a digital sound or a document;
receiving the initial search query from a user; and
in response to receiving the initial search query the server system
predicting a plurality of suggestions, the suggestions comprising digital media items relevant to the received search query;
selecting one or more of the predicted suggestions;
generating a plurality of search results based on the received search query;
selecting one or more of the generated search results;
outputting the selected ones of the predicted suggestions and the selected ones of the generated search results to the user;
the user selecting one of the suggestions to modify the first search query and adding the digital media item of the selected suggestion to the first search query in the search query field to provide a modified search query; and
receiving the modified search query from a user comprising the initial search query modified by a user selected one of the output predicted suggestions.

14. The method of claim 13, wherein the server system comprises a database storing the digital media items which comprise one or more digital image, digital video, digital sound, or tags.

15. The method of claim 13, wherein the selected one or more suggestions and search results comprises matching or predefined methods, models, or metrics.

16. The method of claim 13, wherein the selected one or more suggestions and search results comprises one or more score subset or ranking subset.

17. The method of claim 13, wherein the selected one or more suggestions and search results comprises an advertisement.

18. The method of claim 13, wherein the selected one or more suggestions and search results are determined by at least one subscription, social relationship, profile settings, or characteristic.

19. The method of claim 13, further comprising storing any part of the initial search query.

20. The method of claim 19, whereby storing any part of the search query includes updating user predictability for one or more interests or suggestions.

21. The method of claim 20, whereby updating user predictability for one or more interests or suggestions are based on at least one characteristics, query history, device characteristics, application characteristic, buying history, demographics, traits, language, validation, location, proximity, results history and/or selection history of suggestions and results.

22. A method of providing suggestions and results in response to a search query, comprising:
providing a user interface search display operating on a user processing device, the user interface search display including a search query field for receiving a search query from a user, the search query comprising a digital media query including a digital image, a digital video, a digital sound or a document;
using a server to analyze the received search query, the received search query comprising a digital media item comprising a digital image, a digital video, a digital sound or a document;
for each word or number in the received search query, generate and compare suggestions for relevant digital media items;
for each digital media item, match or process with at least one index, database, object-relational mapping or object-oriented language;
score and generate a ranked list based on the received search query;
compare the received search query with predictability, frequency or popularity from previously selected queries; and
providing and outputting one or more suggestions and results for the search query based on at least one ranking list, predictability, frequency or popularity of the one or more suggestions for modifying the search query, the suggestions comprising digital media items relevant to the received search query;
the user selecting one of the suggestions to modify the search query and adding the digital media item of the selected suggestion to the search query in the search query field to provide a modified search query, and
using the server to analyze the modified search query including a user selected one of the one or more suggestions.

23. The method of claim 22, further comprising;
generating an index for all the words or identifying word for digital media, parts of digital media, or associations for the search queries;
score and generate a ranked list based on one or more matched digital media item, including parts of digital media, or associations;
storing one or more scores, ranked list, predictability, matches, frequency or popularity from previously selected queries in one or more databases; and
outputting one or more suggestions and results containing at least one match digital media, parts of digital media, or associations.

24. The method of claim 22, wherein the digital media items comprise digital images, digital video, digital sounds, documents, or publications.

\* \* \* \* \*